(12) United States Patent
Knowles et al.

(10) Patent No.: US 8,389,780 B2
(45) Date of Patent: Mar. 5, 2013

(54) POLYALPHAOLEFINS AND PROCESSES FOR FORMING POLYALPHAOLEFINS

(75) Inventors: Daniel C. Knowles, Southbury, CT (US); Jesus R. Fabian, Wethersfield, CT (US); Vilan Kosover, Cheshire, CT (US); Susan Ferrarotti, New Hartford, CT (US); E. Brian Fox, Monroe, CT (US); Frank DeBlase, Hopewell Junction, NY (US)

(73) Assignee: Chemtura Corporation, Middlebury, CT (US)

( * ) Notice: Subject to any disclaimer, the term of this patent is extended or adjusted under 35 U.S.C. 154(b) by 0 days.

(21) Appl. No.: 12/928,752

(22) Filed: Dec. 17, 2010

(65) Prior Publication Data
US 2011/0092752 A1  Apr. 21, 2011

Related U.S. Application Data

(62) Division of application No. 12/116,147, filed on May 6, 2008, now Pat. No. 7,880,047.

(51) Int. Cl.
*C07C 9/22* (2006.01)
*C10M 107/02* (2006.01)

(52) U.S. Cl. ............... 585/18; 585/10; 585/12; 508/591
(58) Field of Classification Search ...................... 585/18
See application file for complete search history.

(56) References Cited

U.S. PATENT DOCUMENTS

| | | | |
|---|---|---|---|
| 4,827,073 A | 5/1989 | Wu | |
| 4,892,851 A | 1/1990 | Ewen et al. | |
| 4,912,272 A | 3/1990 | Wu | |
| 4,956,122 A | 9/1990 | Watts et al. | |
| 5,012,020 A | 4/1991 | Jackson et al. | |
| 5,105,051 A | 4/1992 | Pelrine et al. | |
| 5,145,819 A | 9/1992 | Winter et al. | |
| 5,155,080 A | 10/1992 | Elder et al. | |
| 5,177,276 A | 1/1993 | Beach et al. | |
| 5,243,114 A | 9/1993 | Johnson et al. | |
| 5,661,096 A | 8/1997 | Winter et al. | |
| 5,731,254 A | 3/1998 | Winter et al. | |
| 6,706,828 B2 | 3/2004 | DiMaio | |
| 6,858,767 B1 | 2/2005 | DiMaio et al. | |
| 7,129,197 B2 | 10/2006 | Song et al. | |
| 7,129,306 B2 | 10/2006 | DiMaio | |
| 7,662,895 B2 * | 2/2010 | Brant ............................. | 526/129 |
| 7,880,047 B2 * | 2/2011 | Knowles et al. .............. | 585/523 |
| 7,989,670 B2 * | 8/2011 | Wu et al. ....................... | 585/523 |

(Continued)

FOREIGN PATENT DOCUMENTS

| | | |
|---|---|---|
| EP | 0426644 | 5/1991 |
| WO | 03/104292 | 12/2003 |

(Continued)

*Primary Examiner* — Ellen McAvoy
(74) *Attorney, Agent, or Firm* — Joseph Suhadolnik

(57) ABSTRACT

The invention is directed to polyalphaolefins (PAOs) and processes for forming PAOs. In one embodiment, the invention is to a process for forming a PAO comprising polymerizing $C_8$-$C_{12}$ α-olefin monomers in the presence of hydrogen, a $C_8$-$C_{12}$ saturated hydrocarbon, e.g., a $C_8$-$C_{12}$ saturated straight-chain hydrocarbon, and a catalyst system in a reaction vessel, wherein the $C_8$-$C_{12}$ saturated straight-chain hydrocarbon has about the same number of carbon atoms as the $C_8$-$C_{12}$ α-olefin monomers. The $C_8$-$C_{12}$ saturated straight-chain hydrocarbon optionally is derived from a crude PAO product formed by the process of the invention. The invention is also directed to reaction systems for performing the processes of the invention, to processes for controlling PAO viscosity based on residence time, and to the removal of spent catalyst using a solid adsorbent particles.

18 Claims, 9 Drawing Sheets

U.S. PATENT DOCUMENTS

| | | |
|---|---|---|
| 2006/0021231 A1 | 2/2006 | Carey |
| 2007/0000807 A1 | 1/2007 | Wu et al. |
| 2007/0043248 A1 | 2/2007 | Wu et al. |
| 2007/0289897 A1 | 12/2007 | Carey et al. |
| 2007/0298990 A1 | 12/2007 | Carey et al. |
| 2008/0177121 A1* | 7/2008 | Wu et al. ............ 585/530 |
| 2009/0005279 A1* | 1/2009 | Wu et al. ............ 508/591 |
| 2009/0036725 A1* | 2/2009 | Wu et al. ............ 585/521 |
| 2011/0160502 A1* | 6/2011 | Wu et al. ............ 585/16 |

FOREIGN PATENT DOCUMENTS

| | | |
|---|---|---|
| WO | 2007/011459 | 1/2007 |
| WO | 2007/011462 | 1/2007 |
| WO | 2008/010862 | 1/2008 |
| WO | 2008/030387 | 3/2008 |

* cited by examiner

FIG. 4

| Stream No. | 213 | 205 | 204 | 206 | 207 | 208 | 214 | 218 | 217 | 215 | 216 | 210 |
|---|---|---|---|---|---|---|---|---|---|---|---|---|
| kg/hr | Decene Feed | Catalyst Feed | Combined Converg. | Hydrogen Feed | Reactor Crude | Flash Feed | Flash Overhead | Purge (17.65%) | Flash Recycle | WFE Feed | WFE Overhead | Product |
| Decene | 158.0 | | 176.7 | | 22.6 | 22.6 | 22.2 | 3.9 | 18.3 | 0.5 | 0.5 | 0.000 |
| Decane | | | 65.0 | | 78.6 | 78.6 | 77.0 | 13.6 | 63.4 | 1.6 | 1.6 | 0.002 |
| Hydrogen | | | - | 0.237 | 140.7 | 140.7 | 17.61 | 3.109 | 14.50 | 140.7 | - | 140.724 |
| PAO | | | - | | 17.97 | 17.97 | | | | | | |
| Toluene | | 3.109 | 17.97 | | | | | | | 0.36 | 0.36 | 0.000 |
| MAO Solids | | 0.345 | 0.345 | | 0.345 | | | | | | | |
| Metallocene | | 0.004 | 0.004 | | 0.004 | | | | | | | |
| Total | 158.00 | 3.46 | 260.03 | 0.24 | 260.26 | 259.91 | 116.80 | 20.62 | 96.19 | 143.11 | 2.38 | 140.727 |

| Wt. Frac. | | | | | | | | | | | | |
|---|---|---|---|---|---|---|---|---|---|---|---|---|
| Decene | 1.000 | | 0.680 | | 0.087 | 0.087 | 0.190 | 0.190 | 0.190 | 0.003 | 0.190 | 0.000 |
| Decane | | | 0.250 | | 0.302 | 0.302 | 0.659 | 0.659 | 0.659 | 0.011 | 0.659 | 0.000 |
| Hydrogen | | | - | 1.000 | 0.541 | 0.541 | | | | 0.983 | - | 1.000 |
| PAO | | | 0.069 | | 0.069 | 0.069 | 0.151 | 0.151 | 0.151 | 0.003 | 0.151 | |
| Toluene | | 0.899 | | | -0.069 | | | | | | | |
| MAO Solids | | 0.100 | 0.001 | | 0.001327 | | | | | | | |
| Metallocene | | 0.001 | 0.000 | | 0.000017 | | | | | | | |
| Total | 1.000 | 1.000 | 1.000 | 1.000 | 1.000 | 1.000 | 1.000 | 1.000 | 1.000 | 1.000 | 1.000 | 1.000 |

Example 7

Comparative Example A

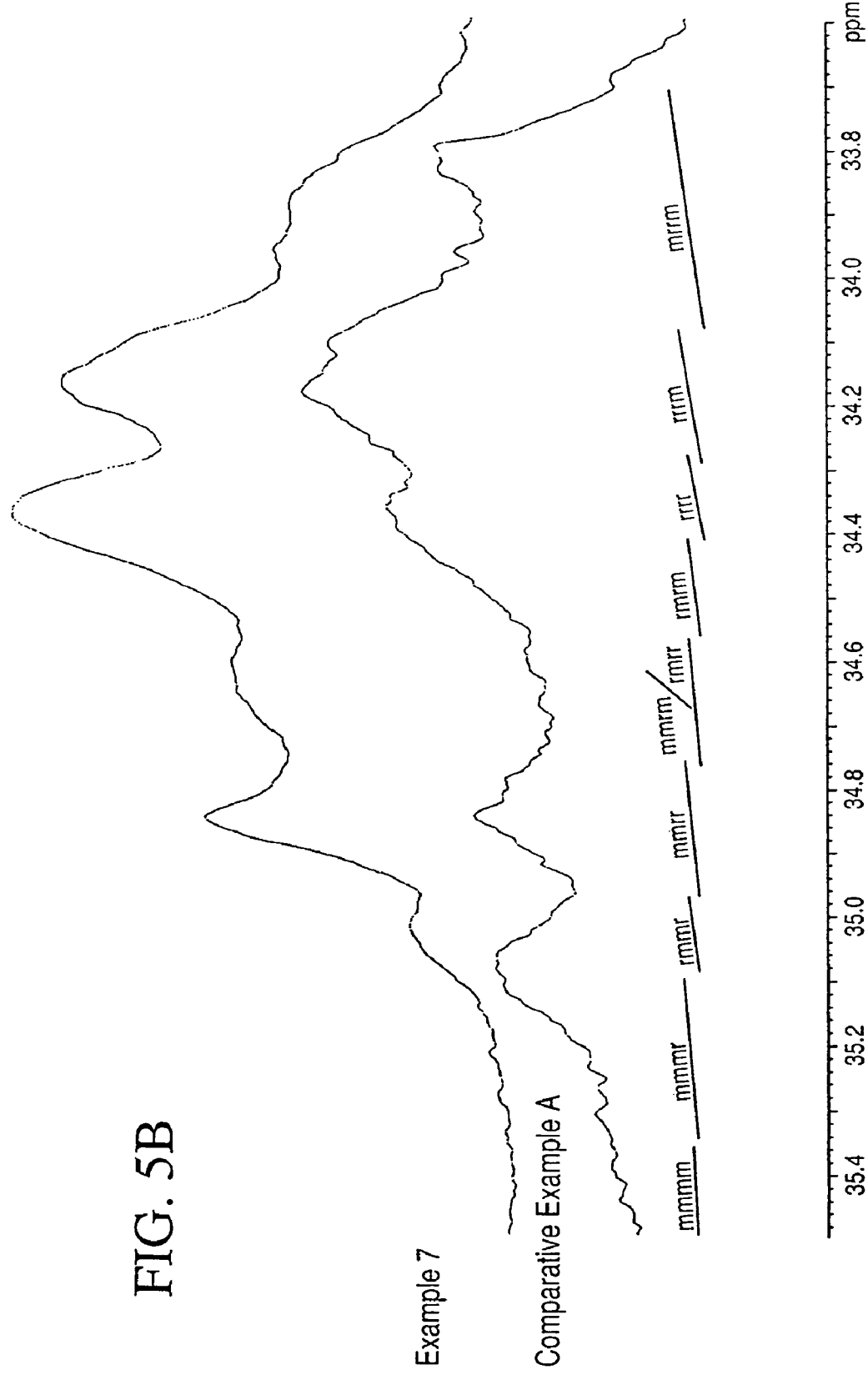

POLYALPHAOLEFINS AND PROCESSES FOR FORMING POLYALPHAOLEFINS

This patent application is a divisional of U.S. patent application Ser. No. 12/116,147, filed May 6, 2008, now U.S. Pat. No. 7,880,047, the disclosure which is incorporated herein by reference.

FIELD OF THE INVENTION

The present invention relates to polyalphaolefins. More particularly, the invention relates to polyalphaolefins and processes and reaction systems for forming polyalphaolefins from an α-olefin, preferably a $C_8$-$C_{12}$ α-olefin such as 1-decene, by co-feeding to the polymerization reaction mixture a $C_8$-$C_{12}$ saturated hydrocarbon, preferably having the same number of carbon atoms as the α-olefin.

BACKGROUND OF THE INVENTION

Efforts to improve upon the performance of natural mineral oil based lubricants by the synthesis of oligomeric hydrocarbon fluids have been the subject of important research and development in the petroleum industry for several decades, leading to recent commercial production of a number of polyalphaolefin synthetic lubricants. These materials are primarily based on the polymerization of α-olefins, such as $C_2$-$C_{20}$ α-olefins. Industrial research efforts on synthetic lubricants have generally focused on fluids exhibiting useful viscosities over a wide range of temperatures, i.e., having an improved viscosity index (VI), while also showing lubricity, thermal, and oxidative stability and pour point equal to or better than mineral oil. These newer synthetic lubricants provide lower friction and hence increased mechanical efficiency across the full spectrum of mechanical loads and do so over a wider range of operating conditions than mineral oil lubricants.

Well known structural and physical property relationships for polymers as contained in the various disciplines of polymer chemistry have pointed the way to α-olefins as a fruitful field of investigation for the synthesis of oligomers with the structure thought to be needed to confer improved lubricant properties thereon. Owing largely to studies on the polymerization of propene and vinyl monomers, the mechanism of the polymerization of α-olefins and the effect of that mechanism on polymer structure is reasonably well understood, providing a strong resource for targeting on potentially useful oligomerization methods and oligomer structures.

Catalytic polymerization of olefins is a known technique for manufacturing basestocks useful as lubricants. There are various known methods for forming polyalphaolefins in the art, such as for example, U.S. Pat. Nos. 4,827,073; 4,892,851; 4,912,272; 5,012,020; 5,177,276; 5,661,096; 5,731,254; 6,706,828; 6,858,767; and 7,129,197, the entirety of which are incorporated herein by reference. Earlier catalytic polymerization processes used chromium-based catalysts, as discussed in U.S. Pat. Nos. 4,827,073 and 5,012,020, Ziegler-type catalysts, such as titanium trichloride, as discussed in U.S. Pat. No. 5,177,276, and aluminum chloride, as discussed in U.S. Pat. No. 4,912,272. These earlier catalysts gave way to later developed processes using various metallocene catalysts and metallocene catalyst systems, as discussed, for example, in U.S. Pat. Nos. 4,892,851; 5,661,096; 5,731,254; 6,706,828; 6,858,767; and 7,129,197. Such catalyst systems typically comprise the combination of: (a) a metallocene compound, typically a metallocene compound that is based on a Group IVb transition metal such as zirconium, and (b) an aluminoxane. Unbridged substituted bis-cyclopentadienyl transition metal metallocene compounds are discussed in U.S. Published Application No. 2007/0043248.

The polyalphaolefins produced by such methods may, for example, be used as lubricants or as lubricant additives, as discussed in U.S. Pub. App. Nos. 2006/0276355; 2007/0289897; and 2007/0298990, the entireties of which are incorporated herein by reference.

U.S. Pat. No. 6,858,767 discloses that a liquid polyalphaolefin homo- or copolymer, preferably 1-decene, which is substantially amorphous is obtained by a polymerization process employing hydrogen and a particular type of metallocene catalyst. Additionally, liquid polyalphaolefin homo- or copolymer containing from 2 to about 12 carbon atoms possess a unique combination of properties, i.e., low molecular weight ($M_w$), low polydispersity index ($M_w/M_n$), controllable kinematic viscosity ($Kv_{100}$), low Iodine Number ($I_2$) and low glass transition temperature ($T_g$) and are substantially amorphous. The liquid polyalphaolefin homo- or copolymers are useful for manufacturing a variety of products including lubricating oils in which the polyalphaolefin functions as a viscosity modifier.

U.S. Pat. No. 7,129,197 discloses that one or more oligomers of an olefin are prepared in the presence of a single-site catalyst. Preferably, the olefin is an α-olefin, and the oligomer is a poly-alpha-olefin (PAO). The PAO so prepared is completely or substantially free of tertiary hydrogen resulting from isomerization. Consequently, the PAO possesses improved biodegradability, improved oxidation resistance, and/or a relatively higher viscosity index. The PAO has many useful applications, such as a component of a lubricant.

U.S. Pat. No. 5,177,276 discloses an alpha-olefin oligomer consisting essentially of repeating units having the structural formula:

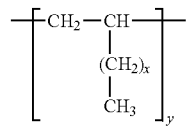

wherein x represents an integer from 3 to 11, inclusive; and y represents the number of repeating units in the oligomer such that the weight average molecular weight is from about 5,000 to about 20,000; said oligomer having from about 70 to 100 percent head-to-tail alignment of the repeating units of the oligomer. Preferably the weight average molecular weight of the oligomer is from 5,000 to about 10,000; and said oligomer is further characterized as having a dispersity of less than about 5.5, and a Z average molecular weight of less than about 24,000. Additionally, U.S. Pat. No. 5,177,276 discloses recycling unconverted feed, which usually contains saturated alpha-olefin, to the oligomerization process to serve as the reaction solvent.

U.S. Pat. No. 5,731,254 discloses a syndiotactic polyolefin is obtained in a high yield by polymerization or copolymerization of an olefin of the formula $R^a$—CH═CH—$R^b$ in the presence of a catalyst consisting of a metallocene of the formula I

in which $M_1$ is titanium, zirconium, vanadium, niobium or tantalum, and an aluminoxane. This polyolefin has a very high molecular weight, a very narrow molecular weight distribution and a very high syndiotactic index. Shaped articles produced from the polymer are distinguished by a high transparency, flexibility, tear resistance and an excellent surface gloss.

U.S. Pat. No. 4,892,851 discloses a metallocene catalyst for use in preparing syndiotactic polyolefins. The catalyst comprises a bridged metallocene in which one of the cyclopentadienyl rings is substituted in a substantially different manner from the other ring. It was discovered that this type of catalyst is highly syndiospecific, and it also produces a polymer with a novel microstructure. The invention further includes the use of one or more of the catalysts in a polymerization process. The catalyst is generally described by the formula

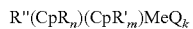

$$R''(CpR_n)(CpR'_m)MeQ_k$$

wherein each Cp is a cyclopentadienyl or substituted cyclopentadienyl ring; each $R_n$ and $R'_m$ is the same or different and is a hydrocarbyl radical having 1-20 carbon atoms; R" is a structural bridge between the two Cp rings imparting stereorigidity to the catalyst; Me is a group 4b, 5b, or 6b metal from the Periodic Table of Elements; each Q is a hydrocarbyl radical having 1-20 carbon atoms or is a halogen; $0 \leq k \leq 3$; $0 \leq n \leq 4$; $1 \leq m \leq 4$; and wherein $R'_m$ is selected such that $(CpR'_m)$ is a sterically different ring than $(CpR_n)$.

U.S. Pat. No. 4,827,073 discloses a process for oligomerizing alpha olefin to produce lubricant range hydrocarbon stock including the step of contacting said alpha olefin with a supported solid reduced Group VIB (e.g., chromium) catalyst under oligomerization conditions at a temperature of about 90° to 250° C. to produce liquid lubricant hydrocarbon. The product comprises the polymeric residue of linear $C_6$-$C_{20}$ 1-alkenes, said composition having a branch ratio of less than 0.19. The weight average molecular weight is between 420 and 45,000, number average molecular weight between 420 and 18,000, molecular weight distribution between 1 and 5 and pour point below −15° C. The hydrogenated lubricant range hydrocarbon product has viscosity index of about 130 to 280 and viscosity up to about 750 cS. The process is particularly useful where the starting alpha olefin consists essentially of olefinic hydrocarbon having 8 to 14 carbon atoms or mixtures thereof; wherein the process conditions include reaction temperature of about 100° to 180°; and wherein the support catalyst includes porous inert silica.

U.S. Pat. No. 5,661,096 discloses Ziegler catalysts based on a metallocene as the transition metal component and an aluminoxane as the activator, preactivation of the metallocene with the aluminoxane results in a considerable increase in the activity of the catalyst system. Furthermore, 1-olefin polymers of a high degree of isotacticity and having compact, spherical particles, a very narrow particle size distribution and a high bulk density are obtained by means of a catalyst system of this type.

U.S. Pat. No. 5,012,020 discloses a novel composition is disclosed that is particularly useful as a lubricant viscosity index improver. The composition comprises branched branched $C_{30}$-$C_{10000}$ hydrocarbons that have a branch ratio of less than 0.19 and viscosity at 100° C. between 725 CS and 15,000 cS. The novel compositions comprise the product of the oligomerization of $C_6$ to $C_{20}$ alpha-olefin feedstock, or mixtures thereof, under oligomerization conditions at a temperature between −20° C. and +90° C. in contact with a reduced valence state Group VIB metal catalyst on porous support. The compositions have viscosities at 100° C. between 725 cS and 15,000 cS. Using the foregoing compositions in admixture with mineral oil and synthetic lubricants provides novel lubricant blends that show an elevated viscosity index. The mixtures also show an increased stability to shear stress at high temperature with all blends notable by exhibiting Newtonian flow.

U.S. Pat. No. 4,912,272 discloses a lubricant mixtures having unexpectedly high viscosity indices. The mixtures are blends of high viscosity index polyalphaolefins (HVIXPAO) prepared with activated chromium on silica catalyst and polyalphaolefins prepared with BF3, aluminum chloride, or Ziegler-type catalyst. Superior blends are also prepared from HVIXPAO with mineral oil and/or other synthetic liquid lubricants.

U.S. Pat. No. 6,706,828 discloses a process for the preparation of a poly(α-olefin) polymer wherein the process comprises polymerizing at least one α-olefin in the presence of hydrogen and a catalytically effective amount of catalyst comprising the product obtained by combining a metallocene catalyst with a cocatalyst, the metallocene catalyst being at least one meso compound of general formula:

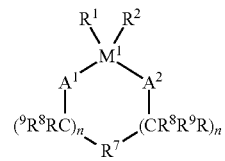

wherein: $A^1$ and $A^2$ are independently selected from the group consisting of mononuclear and polynuclear hydrocarbons;

$M^1$ is a metal from group IVb, Vb, or VIb of the Periodic Table;

$R^1$ and $R^2$ are independently selected from the group consisting of hydrogen, $C_1$-$C_{10}$ alkyl, $C_1$-$C_{10}$-alkoxy, $C_6$-$C_{10}$ aryl, $C_6$-$C_{10}$ aryloxy, $C_2$-$C_{10}$ alkenyl, $C_7$-$C_{40}$ arylalkyl, $C_7$-$C_{40}$ alkylaryl, $C_8$-$C_{40}$ arylalkenyl and halogen;

$R^7$ is selected from the group consisting of:

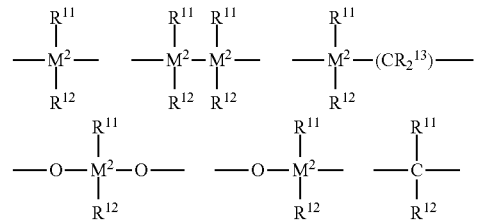

$=BR^{11}$, $=AlR^{11}$, $—Ge—$, $—Sn—$, $—O—$, $—S—$, $=SO$, $=SO_2$, $=NR^{11}$, $=CO$, $=PR^{11}$ and $=P(O)R^{11}$, where $R^{11}$, $R^{12}$, and $R^{13}$ are independently selected from the group consisting of hydrogen, halogen, $C_1$-$C_{10}$ alkyl, $C_1$-$C_{10}$ fluoroalkyl, $C_6$-$C_{10}$ aryl, $C_6$-$C_{10}$ fluoroaryl, $C_1$-$C_{10}$ alkoxy, $C_2$-$C_{10}$ alkenyl, $C_7$-$C_{40}$ arylalkyl, $C_8$-$C_{40}$ arylalkenyl, and $C_7$-$C_{40}$ alkylaryl, or $R^{11}$ and $R^{12}$ or $R^{11}$ and $R^{13}$, in each case with the atoms connecting them, form a ring; and $M^2$ is selected from the group consisting of silicon, germanium, and tin;

$R^8$ and $R^9$ are independently selected from the group consisting of hydrogen, halogen, $C_1$-$C_{10}$ alkyl, $C_1$-$C_{10}$ fluoroalkyl, $C_6$-$C_{10}$ aryl, $C_6$-$C_{10}$ fluoroaryl, $C_1$-$C_{10}$ alkoxy, $C_2$-$C_{10}$ alkenyl, $C_7$-$C_{ao}$ arylalkyl, $C_8$-$C_{40}$ arylalkenyl, and $C_7$-$C_{40}$ alkylaryl; m and n are identical or different and are zero, 1, or 2, with m plus n being zero, 1 or 2.

Regardless of the catalyst system and process parameters employed, it has been difficult to directly produce lower viscosity range polyalphaolefins, e.g., polyalphaolefins having a viscosity of approximately 100 cSt or below, without incurring lower selectivity and yields due to the simultaneous production of higher viscosity byproducts and higher molecular weight oligomers and polymers. Thus, a significant problem in the manufacture of synthetic lubricants is the production of lubricants in a preferred viscosity range at high selectivity, and yield, as well as conversion. Thus, the need exists for processes and reaction systems for forming polyalphaolefins of desired lubricant viscosity at high conversion, selectivity and yield.

SUMMARY OF THE INVENTION

The present invention is directed to high selectivity processes for forming polyalphaolefins (PAOs) from an α-olefin monomer. It has surprisingly and unexpectedly been discovered that the addition of a saturated hydrocarbon, preferably a saturated hydrocarbon having about the same number of carbon atoms as the α-olefin monomer, to a PAO reaction vessel with the α-olefin monomer in the presence of hydrogen and a suitable catalyst system increases selectivity while maintaining desirable physical characteristics for the resulting PAO such as viscosity, viscosity index, Iodine Number, molecular weight ($M_w$ and $M_n$) and tacticity, relative to similar systems in which such hydrocarbons are not or are minimally co-fed to the reaction system.

In a first embodiment, the process comprises the steps of adding a $C_8$-$C_{12}$ α-olefin, a $C_8$-$C_{12}$ saturated hydrocarbon, hydrogen, and a catalytically effective amount of a catalyst system to a reaction vessel, wherein the $C_8$-$C_{12}$ saturated hydrocarbon is fed to the reaction vessel in an amount ranging from 5 to 70 weight percent, e.g., from 10 to 50 weight percent or from 15 to 30 weight percent, based on the combined weight of the $C_8$-$C_{12}$ α-olefin and the $C_8$-$C_{12}$ saturated hydrocarbon fed to the reaction vessel; and polymerizing the $C_8$-$C_{12}$ α-olefin in the reaction vessel in the presence of the $C_8$-$C_{12}$ saturated hydrocarbon, the hydrogen, and the catalyst system under conditions effective to form the PAO. The process preferably is a continuous process.

In a second embodiment, the invention is to a process, preferably a continuous process, for forming a PAO, comprising the steps of adding an α-olefin, a hydrocarbon having a 50° C. vapor pressure within 20%, e.g., within 10% or within 5%, of the vapor pressure of the α-olefin, hydrogen, and a catalytically effective amount of a catalyst system to a reaction vessel; and polymerizing the α-olefin in the reaction vessel in the presence of the hydrocarbon, the hydrogen, and the catalyst system under conditions effective to form the PAO.

In the above embodiments, the olefin, e.g., the $C_8$-$C_{12}$ α-olefin and the hydrocarbon, e.g., $C_8$-$C_{12}$ saturated hydrocarbon, optionally have the same number of carbon atoms, optionally within 1 carbon atom. For example, if the $C_8$-$C_{12}$ α-olefin comprises 1-decene, then the $C_8$-$C_{12}$ saturated hydrocarbon preferably comprises a decane such as n-decane. The hydrocarbons, e.g., $C_8$-$C_{12}$ saturated hydrocarbons, optionally are maintained in the reaction vessel at a level of from 8 to 40 weight percent, based on the combined weight of the $C_8$-$C_{12}$ α-olefin, the $C_8$-$C_{12}$ saturated hydrocarbon, and the PAO in the reaction vessel. The catalyst system preferably comprises a metallocene catalyst, e.g., a bridged metallocene catalyst such as diphenylmethylene (cyclopentadienyl-9-fluorenyl)zirconium dichloride, and optionally further comprises an aluminoxane cocatalyst, e.g., methylaluminoxane (MAO). As indicated above, in either embodiment, the process typically is highly selective, e.g., providing a PAO selectivity greater than 80 wt. %, greater than 85 wt. %, greater than 90 wt. % or greater than 95 wt. %. Additionally, the process typically has high overall conversion, e.g., greater than 95 percent, and a high yield, e.g., greater than 85 percent, greater than 90 percent, or greater than 95 percent. The polymerization processes optionally are conducted at a temperature ranging from 105° C. to 170° C., and preferably at a pressure from 520 to 720 kPag. The process preferably has a PAO residence time of from 10 to 60 minutes, e.g., from 15 to 45 minutes.

In a preferred aspect, the process initially forms a crude PAO product comprising the PAO, unreacted monomer, and $C_8$-$C_{12}$ saturated hydrocarbon, and the process further comprises the steps of separating the $C_8$-$C_{12}$ saturated hydrocarbons from the crude PAO product, and adding at least a portion of the separated $C_8$-$C_{12}$ saturated hydrocarbons to the reaction vessel. Optionally, a first portion of the separated $C_8$-$C_{12}$ saturated hydrocarbons is purged, and a second portion of the separated $C_8$-$C_{12}$ saturated hydrocarbons is added to the reaction vessel. The unreacted monomer may be separated from the crude PAO product with the separated $C_8$-$C_{12}$ saturated hydrocarbons and added to the reaction vessel with the separated $C_8$-$C_{12}$ saturated hydrocarbons. Optionally, the process further comprises the step of contacting a crude PAO product from the reaction vessel with solid adsorbent particles packed in a catalyst removal column under conditions effective to selectively adsorb spent catalyst from the PAO reaction system.

In another embodiment, the invention is to a novel PAO composition, which, in one embodiment, may be formed by the above processes of the present invention. The PAO comprises from 0.5 to 5 mole % of mm triads and from 40 to 58 mole % of rr triads, as determined by $^{13}C$ NMR. The PAO also preferably comprises from 37 to 59.5 mole % of mr triads. The PAO ideally is substantially free of peaks in a region of from 27.0 to 29.0 ppm, and/or in a region of about 20.0 ppm and/or in a region of about 42.5 ppm in a $^{13}C$ NMR spectrum. The PAO preferably has a high degree of saturation, and ideally has an Iodine Number of from 0.2 to 5. The PAO preferably is formed by polymerizing an olefin monomer, e.g., a $C_8$-$C_{12}$ olefin, preferably 1-decene, in the presence of a metallocene catalyst, preferably a bridged metallocene, and hydrogen, as described above. The viscosity of the PAO may vary, but preferably the PAO has a kinematic viscosity at 100° C. from 50 to 500 centistokes, e.g., from 50 to 150 centistokes.

In another embodiment, the invention is directed to a catalyst removal column in fluid communication with a PAO reaction vessel. The catalyst removal column is packed with solid adsorbent particles configured to selectively adsorb spent catalyst from the PAO reaction system. The solid adsorbent particles may, for example, be selected from the group consisting of acidic clay, zeolites, calcium oxide, magnesium oxide, silicates and mixtures thereof. Optionally, the solid adsorbent is dried, using methods known in the art, to remove any moisture. In a preferred aspect, the solid adsorbent particles comprise a metal oxide. The solid adsorbent particles may have an average particle size of from 100 μm to 1 cm. Since the catalyst removal column does not employ water to deactivate the catalyst, the catalyst removal column is particularly well suited for being employed in the PAO synthesis processes in which at least a portion of a crude PAO product is to be recycled to the reaction vessel.

In another embodiment, the invention is to a process for controlling PAO viscosity based on PAO residence time. Specifically, it has surprisingly and unexpectedly been discovered that residence time has an inverse relationship on PAO viscosity. In this aspect, the invention is to a process for forming a PAO, comprising the step of polymerizing in a reaction vessel a $C_8$-$C_{12}$ α-olefin in the presence of hydrogen, and a catalytically effective amount of a catalyst system under conditions effective to form the PAO. The PAO has an average residence time in the reaction vessel of greater than 1 minute, and the PAO has a kinematic viscosity of less than 1000 cSt, e.g., less than 500 cSt, less than 250 cSt, less than 150 cSt, or less than 100 cSt. Preferably, the PAO has an average residence time in the reaction vessel of greater than 5 minutes, and the PAO has a kinematic viscosity of less than 200 cSt, e.g., less than 150 cSt, or less than 100 cSt. More preferably, the PAO has an average residence time in the reaction vessel of greater than 10 minutes, and the PAO has a kinematic viscosity of less than 150 cSt, e.g., less than 125 cSt, or less than 100 cSt. As with the above processes, one or more $C_8$-$C_{12}$ saturated hydrocarbon, preferably have the same number of carbon atoms as the α-olefin, may be co-fed to the reaction vessel. Preferably, the $C_8$-$C_{12}$ α-olefin comprises 1-decene and, if present, the $C_8$-$C_{12}$ saturated hydrocarbon comprises n-decane. The catalyst system preferably comprises a metallocene catalyst, e.g., a bridged metallocene catalyst such as diphenylmethylene (cyclopentadienyl-9-fluorenyl)zirconium dichloride, and optionally further comprises an aluminoxane cocatalyst, e.g., methylaluminoxane (MAO).

In another embodiment, the invention is to a reaction system for forming PAO, preferably a continuous reaction system for forming PAO. The reaction system comprises a reaction vessel in which a $C_8$-$C_{12}$ α-olefin contacts a $C_8$-$C_{12}$ saturated hydrocarbon, hydrogen, and a catalytically effective amount of catalyst system under conditions effective to form a crude PAO stream. The system also includes a catalyst separation unit in fluid communication with the reaction vessel for separating spent catalyst from the crude PAO stream and forming a reduced catalyst PAO stream. The reaction system further comprises a separation zone in fluid communication with the catalyst separation unit for separating the reduced catalyst PAO stream into a purified PAO stream and a recycle stream comprising the $C_8$-$C_{12}$ saturated straight-chain hydrocarbon and unreacted $C_8$-$C_{12}$ α-olefin. According to this embodiment, the recycle stream is in fluid communication between the separation zone and the reaction vessel. The $C_8$-$C_{12}$ α-olefin and the $C_8$-$C_{12}$ saturated hydrocarbon preferably have the same number of carbon atoms. Preferably, the $C_8$-$C_{12}$ α-olefin comprises 1-decene and the $C_8$-$C_{12}$ saturated hydrocarbon comprises n-decane. The catalyst system preferably comprises a metallocene catalyst, e.g., a bridged metallocene catalyst such as diphenylmethylene (cyclopentadienyl-9-fluorenyl)zirconium dichloride, and optionally further comprises an aluminoxane cocatalyst, e.g., MAO.

In another embodiment, the invention is to a reaction system, preferably a continuous reaction system, for forming PAO, comprising a reaction vessel in which an α-olefin contacts a hydrocarbon having a 50° C. vapor pressure within 20%, e.g., within 10% or within 5%, of the α-olefin, hydrogen, and a catalytically effective amount of catalyst system under conditions effective to form a crude PAO stream. The system also includes a catalyst separation unit in fluid communication with the reaction vessel for separating spent catalyst from the crude PAO stream and forming a reduced catalyst PAO stream. A separation zone is in fluid communication with the catalyst separation unit for separating the reduced catalyst PAO stream into a purified PAO stream and a recycle stream comprising the hydrocarbon and unreacted α-olefin. The recycle stream is in fluid communication between the separation zone and the reaction vessel. The hydrocarbon preferably comprises a saturated hydrocarbon having an equal number of carbon atoms, within 1 carbon atom, as the α-olefin. Preferably, the α-olefin comprises 1-decene and the hydrocarbon comprises n-decane. The catalyst system preferably comprises a metallocene catalyst, e.g., a bridged metallocene catalyst such as diphenylmethylene (cyclopentadienyl-9-fluorenyl)zirconium dichloride, and optionally further comprises an aluminoxane cocatalyst, e.g., MAO.

BRIEF DESCRIPTION OF THE DRAWINGS

The present invention will be better understood in view of the appended non-limiting figures, in which:

FIG. 4 is a table providing exemplary relative flow rates of various components contained in the effluent streams of the reaction system of FIG. 2;

DETAILED DESCRIPTION OF THE INVENTION

Introduction

Figure 1:
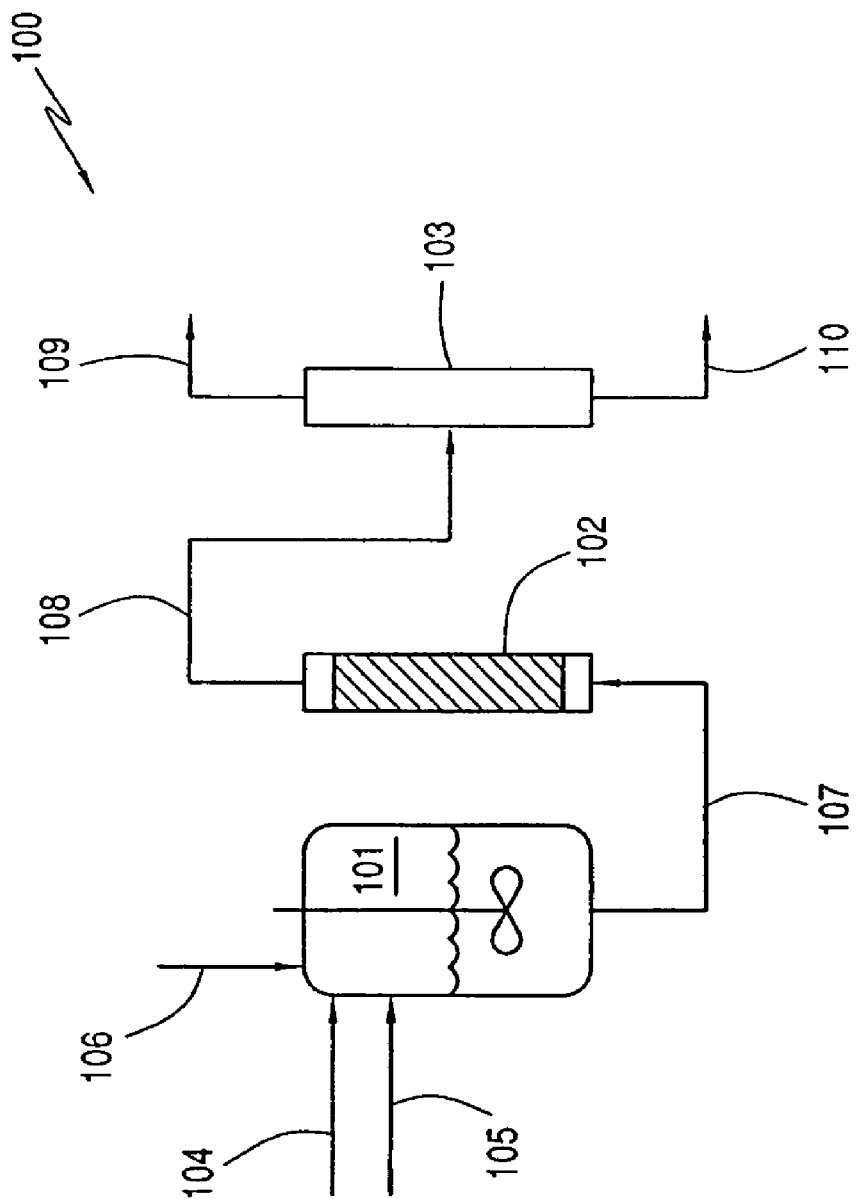
FIG. 1 is an exemplary flow diagram of a reaction system for forming polyalphaolefin ("PAO") according to one embodiment of the invention.

In a first embodiment, the present invention relates to processes for forming polyalphaolefins ("PAOs") from an α-olefin monomer, preferably a $C_8$-$C_{12}$ α-olefin monomer, more preferably 1-decene monomer. In this embodiment, the invention is to a process for polymerizing $C_8$-$C_{12}$ α-olefins, such as 1-decene, in the presence of hydrogen and a catalytically effective amount of a catalyst (or catalyst system) to form oligomers and/or polymers having viscosities and other physical properties suitable for synthetic lubricant applications. In this embodiment, a $C_8$-$C_{12}$ saturated hydrocarbon, preferably saturated straight-chain hydrocarbon, preferably having the same number of carbon atoms as the $C_8$-$C_{12}$ α-olefin monomer, is co-fed to the reaction mixture with the monomer. For example, if the monomer comprises 1-decene, then the saturated straight or branched chain hydrocarbon preferably comprises one or more decanes (in particular n-decane). In this embodiment, the $C_8$-$C_{12}$ saturated hydrocarbon, preferably saturated straight-chain hydrocarbon, is ideally present in the feed in an amount ranging from 5 to 50 weight percent, preferably in an amount ranging from 10 to 50 weight percent, and most preferably in an amount ranging from 15 to 30 weight percent, based on the weight of the α-olefin monomer (e.g., the $C_8$-$C_{12}$ α-olefin monomer) and the $C_8$-$C_{12}$ saturated hydrocarbon in the feed.

It has surprisingly and unexpectedly been discovered that by maintaining a heightened concentration of saturated hydrocarbons in the reaction mixture, the overall selectivity and yield of the resulting process may be advantageously increased. This increase in selectivity and yield desirably and surprisingly is not generally accompanied by a significant change in PAO viscosity. In addition, the process of this embodiment of the present invention may provide improved conversion. Optionally, the $C_8$-$C_{12}$ saturated hydrocarbon is derived from a crude PAO byproduct formed in the polymerization process.

In a second embodiment, the invention relates to a process for forming a PAO, comprising the steps of: (a) polymerizing an α-olefin monomer, preferably a $C_8$-$C_{12}$ α-olefin monomer, more preferably a 1-decene monomer, in the presence of hydrogen, and a catalyst system in a reaction vessel, and (b) adding a hydrocarbon to the reaction vessel. In this embodiment, the hydrocarbon has a vapor pressure within 20%, e.g., within 10% or within 5%, of the vapor pressure of the pure α-olefin monomer (as measured at 50° C.). Preferably, the hydrocarbon comprises a saturated hydrocarbon, e.g., a saturated hydrocarbon having a substantially equal number of carbon atoms, within 1 carbon atom, as the major α-olefin monomer. More preferably, the hydrocarbon comprises a $C_8$-$C_{12}$ saturated hydrocarbon, preferably having the same number of carbon atoms as the major α-olefin monomer. As with the first embodiment, the hydrocarbon optionally is derived from a crude PAO product formed in the polymerization process. Similarly, the hydrocarbon optionally is present in the feed in an amount ranging from 5 to 50 weight percent, preferably in an amount ranging from 10 to 50 weight percent, and most preferably in an amount ranging from 15 to 30 weight percent, based on the combined weight of the α-olefin monomer (preferably the $C_8$-$C_{12}$ α-olefin monomer) and the hydrocarbon fed to the reaction vessel.

In a third embodiment, the present invention is directed to reaction systems suitable for performing the inventive processes of the invention.

In a fourth embodiment, the invention is to a catalyst removal column that is particularly well-suited for use in a continuous PAO reaction system. The catalyst removal column is in fluid communication with a PAO reaction vessel, and is packed with solid adsorbent particles configured to selectively adsorb spent catalyst from the PAO reaction system. This embodiment may be desired for those aspects in which a portion of the product is recycled back to the reaction vessel, as described above, because the column allows for the efficient separation of spent catalyst from the crude effluent stream without the use of water, which, if recycled to the reaction vessel, would deactivate the metallocene catalyst system.

In a fifth embodiment, the invention is to a process for forming a PAO in which the 1 kinematic viscosity of the PAO is controlled based on the residence time of the PAO in the reaction vessel. The process comprises the step of polymerizing in a reaction vessel a $C_8$-$C_{12}$ α-olefin in the presence of hydrogen and a catalytically effective amount of a catalyst (or catalyst system) under conditions effective to form the PAO, wherein the PAO has an average residence time in the reaction vessel of greater than 1 minute, and wherein the PAO has a kinematic viscosity of no greater than 500 cSt.

Monomers

As indicated above, in the processes of the invention an α-olefin monomer, preferably a $C_8$-$C_{12}$ α-olefin monomer, is polymerized in the presence of hydrogen and a catalytically effective amount of catalyst (or a catalyst system) to form PAO. The α-olefin preferably is selected from the group consisting of 1-octene, 1-nonene, 1-decene, 1-undecene, and 1-dodecene, more preferably is selected from the group consisting of 1-octene, 1-decene, and 1-dodecene, and most preferably is 1-decene. The purity level of the α-olefin employed, preferably 1-decene, ideally, but not necessarily, is greater than 90 wt. %, e.g., greater than 94 wt. % or greater than 98 wt. %.

The amount of α-olefin that is added to the reaction vessel may vary depending, for example, on the activity of the catalyst employed. In some exemplary embodiments, the α-olefin monomer, e.g., $C_8$-$C_{12}$ α-olefin, is added to the reaction vessel in an amount ranging from 10 to 95 weight percent, e.g., from 50 to 95 weight percent or from 70 to 93 weight percent, based on the total weight of all material fed to the reaction vessel. Ideally, the $C_8$-$C_{12}$ α-olefin monomer comprises 1-decene in an amount greater than 75 weight percent, e.g., greater than 90 weight percent or greater than 99 weight percent, based on the total weight of $C_8$-$C_{12}$ α-olefin monomer added to the reaction vessel.

Optionally, the $C_8$-$C_{12}$ α-olefin monomer comprises a major $C_8$-$C_{12}$ α-olefin monomer, e.g., 1-decene, in combination with one or more minor monomers. As used herein, a "major" $C_8$-$C_{12}$ α-olefin monomer is a $C_8$-$C_{12}$ α-olefin monomer that is present in a polymerization feedstock in an amount greater than or equal to 50 weight percent, based on total monomer contained in the feedstock. Conversely, for purposes of the present specification, a "minor" monomer is a monomer that is present in a polymerization feedstock in an amount less than 50 weight percent, based on total monomer contained in the feedstock. Thus, the PAO that is formed in the processes of the invention may be a homopolymer of an α-olefin monomer, e.g., a $C_8$-$C_{12}$ α-olefin monomer such as 1-decene, or a copolymer of a major $C_8$-$C_{12}$ α-olefin monomer and one or more minor monomers. The minor monomers(s) may comprise, for example, one or more $C_2$-$C_{25}$ monomers, preferably one or more $C_2$-$C_{25}$ α-olefins. The combination of two or more monomers in the polymerization reaction mixture may be desirable, for example, to control the branching characteristics and viscosity of the resulting PAO product that is formed, as described, for example, in U.S. patent application Ser. No. 12/026,981, filed Feb. 6, 2008, entitled "Controlling Branch Level and Viscosity of Polyalphaolefins with Propene Addition," the entirety of which is incorporated herein by reference. For example, in some exemplary embodiments, the monomer feedstock may comprise: (1) from about 75 weight percent to about 99 weight percent major $C_8$-$C_{12}$ α-olefin monomer (such as 1-decene), e.g., from about 80 weight percent to about 90 weight percent major $C_8$-$C_{12}$ α-olefin monomer, from about 85 weight percent to about 95 weight percent major $C_8$-$C_{12}$ α-olefin monomer, or from about 90 weight percent to about 99 weight percent major $C_8$-$C_{12}$ α-olefin monomer; and (2) from about 1 weight percent to about 25 weight percent minor monomer(s) (such as propene), e.g., from about 10 weight percent to about 20 weight percent minor monomers, from about 5 weight percent to about 15 weight percent minor monomers, or from about 1 weight percent to about 10 weight percent minor monomers. The minor monomers may include, for example, one or more of the following: ethylene, propylene, 2-methylpropene, 1-butene, 3-methyl-1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and the like. If the monomers employed include decene and one or more minor monomers, then the weight ratio of the decene to the one or more minor monomers in the polymerization reaction mixture preferably is greater than 3:1, e.g., greater than 4:1, greater than 5:1, greater than 10:1, greater than 20:1 or greater than 50:1.

Hydrogen

The monomers employed in the processes of the invention preferably are converted to PAOs in the presence of hydrogen. A key role of hydrogen in the reaction is to hydrogenate residual unsaturation left in the PAO molecules. Thus, the presence of hydrogen in the reaction vessel may advantageously result in the elimination of the need for an additional hydrogenation step after formation of the PAO. Unfortunately, hydrogen may add to the unsaturation in the monomer α-olefin to form a saturated byproduct which is generally unreactive. It is therefore desirable to promote the hydrogenation of PAO over the hydrogenation of the α-olefin. Desirably, however, the formation (and/or addition) of saturated monomer reduces the overall viscosity of the reaction mixture and may enhance hydrogen solubility. Without being bound by theory, enhancing hydrogen solubility may enable better diffusion of hydrogen through the reaction mixture to the unsaturation sites of the PAO. The net result of the improved mass transfer of hydrogen to the PAO is a favorable shift in the relative reaction rates of PAO hydrogenation over α-olefin hydrogenation, and thus a reduction in the amount of monomer that is hydrogenated resulting in improved selectivity and yield. See, for example, Published U.S. Patent Appl. No. 2007/0043248, filed Jul. 19, 2006, the entirety of which is incorporated herein by reference.

By carrying out the polymerization reaction in the presence of hydrogen and employing the catalysts described herein, the liquid PAOs formed by the processes of the invention are substantially saturated and, therefore, will possess a low Iodine Number, e.g., an Iodine Number of from about 0.0 to about 10, preferably from about 0.1 to about 5, more preferably from about 0.2 to about 5, and most preferably from about 0.2 to about 3. As used herein, Iodine Number refers to the mass of iodine in grams that is consumed by 100 grams of polymer. In a preferred embodiment, and for purposes of the present specification, Iodine Number is determined as described in Gallo et al., "Unsaturation in Isoprene-Isobutylene Copolymers", *Industrial and Engineering Chemistry, Vol.* 40, (1948) pp. 1277-1280, the entirety of which is incorporated herein by reference, but using o-dichlorobenzene as solvent, a 0.8 g sample size, 50% of the associated reagent volumes, and without reflux.

Preferably, the monomer and the hydrogen are co-fed into the polymerization reaction vessel. By "co-fed" it is meant that the monomer and hydrogen are fed to the reaction vessel simultaneously, at least in part (whether in a single combined stream or separate streams). In one aspect, hydrogen is added to the reaction vessel separately from the monomer feedstock. For example, the hydrogen may be added directly to the reaction mixture through a sparging system. Additionally or alternatively, the hydrogen may be added to the monomer feedstock, optionally under pressure, prior to addition to the reaction vessel.

The amount of hydrogen fed to the reaction vessel may vary widely depending, for example, on the desired degree of hydrogenation, and the activity of the catalyst system that is employed. Optionally, hydrogen is added to the reaction vessel in an amount greater than 0.01 moles hydrogen per mole of monomer, e.g., greater than 0.04 moles hydrogen per mole of monomer or greater than 0.08 moles hydrogen per mole of monomer. In terms of ranges, optionally from 0.01 to 1.2 moles of hydrogen are fed to the reaction vessel per mole of monomer, e.g., from 0.04 to 0.76 moles hydrogen per mole of monomer or from 0.08 to 0.12 moles hydrogen per mole of monomer.

In some exemplary embodiments, the flow rate of hydrogen to the reaction vessel is from 10 to 10,000 standard cubic centimeters per minute (sccm) per liter of reactor, e.g., from 10 to 5,000 sccm per liter of reactor, or from 500 to 1000 sccm/min per liter of reactor.

Hydrocarbon

As indicated above, in some aspects of the invention, a saturated hydrocarbon, e.g., a $C_8$-$C_{12}$ saturated hydrocarbon, preferably a $C_8$-$C_{12}$ saturated straight chain hydrocarbon, is co-fed to the reaction mixture with the α-olefin monomer, e.g., the $C_8$-$C_{12}$ α-olefin monomer. In a preferred embodiment, the hydrocarbon has the same number of carbon atoms as the major $C_8$-$C_{12}$ α-olefin monomer. Similarly, in some embodiments, a hydrocarbon (preferably a saturated hydrocarbon having a substantially equal number of carbon atoms, within 1 carbon atom, as the major α-olefin monomer) having a 50° C. vapor pressure within 20%, e.g., within 10% or within 5%, of the vapor pressure of the major α-olefin monomer that is added to the polymerization reaction vessel is co-fed to the reaction mixture with the major α-olefin monomer.

It has surprisingly and unexpectedly been discovered that by co-feeding a saturated hydrocarbon, e.g., a $C_8$-$C_{12}$ saturated hydrocarbon, preferably a $C_8$-$C_{12}$ saturated straight chain hydrocarbon, with monomer to the reaction vessel, selectivity and yield may be advantageously increased. The level of saturated hydrocarbons that is co-fed to the reaction system may vary depending on conditions such as the activity of the catalyst system and process conditions employed, but preferably is less than 40 weight percent, e.g., less than 30 weight percent or less than 20 weight percent (but preferably is greater than 5 weight percent, e.g., greater than 10 weight percent or greater than 15 weight percent), based on the combined weight of the α-olefin monomer (e.g., the $C_8$-$C_{12}$ α-olefin monomer) and $C_8$-$C_{12}$ saturated hydrocarbon fed to the reaction vessel. In a preferred aspect, the saturated hydrocarbon level in the reaction vessel is maintained substantially constant. In particularly preferred embodiments, the saturated hydrocarbons are fed to (or maintained in) the reaction vessel at a level ranging from 5 to 50 weight percent, e.g., from 8 to 30 weight percent, from 10 to 50 weight percent, from about 10 to about 25 weight percent, or from 15 to 30 weight percent, based on the combined weight of the α-olefin monomer (e.g., the $C_8$-$C_{12}$ α-olefin monomer) and the $C_8$-$C_{12}$ saturated hydrocarbon fed to the reaction vessel. The weight ratio of the monomer to hydrocarbon in the feed (whether separate or combined) optionally is less than 19:1, e.g., less than 9:1, less than 5.7:1 or less than 2.3:1, and, in terms of ranges, may range from 1:1 to 19:1, e.g., from 9:1 to 19:1, or from 2.3:1 to 5.7:1. These saturated hydrocarbon levels have surprisingly and unexpectedly shown to effectively maximize selectivity and yield, while maintaining commercially acceptable levels of overall PAO production.

Without being bound by theory, the selectivity and yield are believed to be improved by improving access of the hydrogen in the reaction system to unsaturated PAO relative to the monomer. For example, when 1-decene is used as the monomer and a decane, e.g., n-decane, is employed as the saturated hydrocarbon, any unsaturated polydecene formed from the 1-decene monomer may be hydrogenated to a greater extent than the unsaturated polydecene that would be present in a reaction system under the same conditions but in the absence of the saturated hydrocarbon. Conversely, the monomer in the reaction system containing the saturated hydrocarbon, particularly in the amounts claimed, will be less likely to be hydrogenated to form additional saturated hydrocarbons (e.g., forming n-decane from 1-decene) relative to monomer that would be present in a reaction system under the same conditions but in the absence of the saturated hydrocarbon. Thus, the presence of the saturated hydrocarbon, e.g., decane, should suppress formation of additional n-decane, thereby improving overall selectivity and yield.

Saturated hydrocarbons, e.g., $C_8$-$C_{12}$ saturated hydrocarbons, preferably $C_8$-$C_{12}$ saturated straight-chain hydrocarbons, may be formed as a byproduct of the PAO polymerization processes of the present invention. Accordingly, a crude PAO product that is yielded from the reaction vessel optionally may be separated in one or more separation units into an enriched saturated hydrocarbon stream and a purified PAO product stream comprising purified PAO. If more than one separation unit (e.g., distillation column, evaporator (preferably a wiped film evaporator), flash vessel, etc.) is employed in the separation step, then the enriched saturated hydrocarbon stream may comprise, for example, one or more overhead streams from the multiple separation units. Similarly, if more than one separation unit is employed in the separation step, then the purified PAO product stream may comprise, for example, one or more bottoms streams from the multiple separation units.

The concentration of the hydrocarbon (e.g., the $C_8$-$C_{12}$ saturated straight-chain hydrocarbon such as one or more decanes or the hydrocarbon having a 50° C. vapor pressure within 20%, e.g., within 10% or within 5%, of the α-olefin) contained in the enriched saturated hydrocarbon stream will vary depending on reaction conditions, the catalyst employed, and the separation system that is used. In some exemplary embodiments, the enriched saturated hydrocarbon stream may comprise the hydrocarbons in an amount greater than 40 weight percent, e.g., greater than 50 weight percent, greater than 60 weight percent or greater than 75 weight percent, based on the total weight of the enriched saturated hydrocarbon stream. The enriched saturated hydrocarbon stream may also comprise unreacted monomer in an amount greater than 40 weight percent, e.g., greater than 50 weight percent, greater than 60 weight percent or greater than 75 weight percent, based on the total weight of the enriched saturated hydrocarbon stream. The enriched saturated hydrocarbon stream preferably comprises the PAO in an amount less than 5 weight percent, less than 2 weight percent or less than 1 weight percent, based on the total weight of the enriched saturated hydrocarbon stream. Conversely, the purified PAO product stream preferably comprises the hydrocarbons in an amount less than 1 weight percent, e.g., less than 0.5 weight percent or less than 0.1 weight percent, based on the total weight of the purified PAO product stream. The purified PAO product stream preferably comprises PAO in an amount greater than 97 weight percent, e.g., greater than 99 weight percent or greater than 99.9 weight percent, based on the total weight of the purified PAO product stream.

Once separated, at least a portion of the enriched saturated hydrocarbon stream may be recycled to the reaction vessel as a recycle stream, optionally after being combined with the monomer feedstock. Additional hydrocarbon (e.g., commercially available $C_8$-$C_{12}$ saturated hydrocarbon, preferably straight chain hydrocarbon) may be added to the recycle stream and/or to the monomer feedstock, if desired, to boost the concentration of $C_8$-$C_{12}$ saturated hydrocarbon that is contained in the reaction vessel.

In this aspect, a portion of the enriched saturated hydrocarbon stream preferably is removed from the polymerization system as a purge stream to prevent the buildup of undesirable byproducts and contaminants. The purge stream preferably comprises on the order of from 5 to 35 weight percent of the total enriched saturated hydrocarbon stream, e.g., from 10 to 30 weight percent, or from 15 to 25 weight percent. In other words, from about 65 to 95 weight percent, e.g., from 70 to 90 weight percent, or from 75 to 85 weight percent of the enriched saturated hydrocarbon stream preferably is recycled to the reaction vessel.

In an alternative aspect, the saturated hydrocarbon, e.g., $C_8$-$C_{12}$ saturated hydrocarbon or $C_8$-$C_{12}$ saturated straight-chain hydrocarbon, is co-fed to the reaction vessel with the monomer but is not derived from the crude PAO product. In this aspect, for example, the hydrocarbon may be a commercially available saturated hydrocarbon, e.g., a saturated hydrocarbon having a 50° C. vapor pressure within 20%, e.g., within 10% or within 5%, of the vapor pressure of the α-olefin.

In a hybrid aspect, during start up of the reaction vessel, the saturated hydrocarbon initially may be co-fed to the reaction vessel with the monomer but is not derived from the crude PAO product. As indicated above, additional saturated hydrocarbons will be formed as a byproduct of the polymerization process. As the level of saturated hydrocarbon byproducts formed in the reaction system increases and is separated from the crude PAO product and recycled to the reaction vessel, the level of "fresh" hydrocarbon that is co-fed to the system may be gradually decreased until the system reaches a steady state.

As indicated above, additional saturated hydrocarbons, e.g., $C_8$-$C_{12}$ saturated hydrocarbons, may also be formed as a byproduct of the polymerization process of the invention, particularly since the monomer employed will typically comprise a $C_8$-$C_{12}$ α-olefin monomer and the reaction is conducted in the presence of hydrogen. This should be taken into consideration when determining the amount of "fresh" hydrocarbon that is fed to the reaction vessel so that a desired saturated hydrocarbon level is maintained in the reaction vessel. In some exemplary embodiments, the level of saturated hydrocarbons (e.g., the $C_8$-$C_{12}$ saturated hydrocarbon such as one or more decanes or the hydrocarbon having a 50° C. vapor pressure within 20%, e.g., within 10% or within 5%, of the α-olefin) is maintained in the reaction vessel at a level of from 5 to 70 weight percent, e.g., from 8 to 40 weight percent, from 8 to 30 weight percent, or from 15 to 40 weight percent, based on the combined weight of the α-olefin monomer (e.g., the $C_8$-$C_{12}$ α-olefin monomer), saturated hydrocarbons and PAO in the reaction vessel.

Catalyst

The catalyst system used to produce the PAOs of the present invention preferably is formed by activating a metallocene procatalyst with a suitable co-catalyst. The metallocene procatalyst may be bridged or unbridged. Preferably, the metallocene procatalyst comprises one or a mixture of metallocene compounds of the formula (I):

$$(Cp^1R^1_m)R^3(Cp^2R^2_p)MX_q \qquad (I)$$

wherein $Cp^1$ of ligand $(Cp^1R^1_m)$ and $Cp^2$ of ligand $(Cp^2R^2_p)$ are the same or different cyclopendadienyl rings; $R^1$ and $R^2$ each is, independently, a hydrocarbyl, halocarbyl, heterocarbyl, hydrocarbyl-substituted organometalloid or halocarbyl-substituted organometalloid group containing up to 20 carbon atoms; m is an integer from 0 to 5; p is an integer from 0 to 5; two $R^1$ and/or $R^2$ substituents on adjacent carbon atoms of the cyclopentadienyl ring associated therewith can be joined together to form a ring fused to the cyclopentadienyl ring, the fused ring containing from 4 to 20 carbon atoms; $R^3$ is a bridging group bridging $Cp^1$ and $Cp^2$; M is a transition metal having a valence of from 3 to 6; each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2. Methods for preparing these and other useful metallocene procatalysts are known in the art. The catalyst composition for use herein is preferably formed by activating a metallocene procatalyst with a suitable catalyst. The terms "metallocene" and "metallocene procatalyst" as used herein shall be understood to refer to compounds possessing a transition metal M, at least one non-cyclopentadienyl-derived ligand X and zero or one heteroatom-containing ligand Y, the ligand being coordinated to M and corresponding in number to the valence thereof. Such compounds, cocatalysts useful for their activation to provide metallocene catalysts that may be employed for the polymerization of olefins to provide polyolefin homopolymers and copolymers, and/or polymerization processes employing one or more of the metallocene catalysts are described in, among others, U.S. Pat. Nos. 4,752,597; 4,892,851; 4,931,417; 4,931,517; 4,933,403; 5,001,205; 5,017,714; 5,026,798; 5,034,549; 5,036,034; 5,055,438; 5,064,802; 5,086,134; 5,087,677; 5,126,301; 5,126,303; 5,132,262; 5,132,380; 5,132,381; 5,145,819; 5,153,157; 5,155,080; 5,225,501; 5,227,478; 5,241,025; 5,243,002; 5,278,119; 5,278,265; 5,281,679; 5,296,434; 5,304,614; 5,308,817; 5,324,800; 5,328,969; 5,329,031; 5,330,948; 5,331,057; 5,349,032; 5,372,980; 5,374,753; 5,385,877; 5,391,629; 5,391,789; 5,399,636; 5,401,817; 5,406,013; 5,416,177; 5,416,178; 5,416,228; 5,427,991; 5,439,994; 5,441,920; 5,442,020; 5,449,651; 5,453,410; 5,455,365; 5,455,366; 5,459,117; 5,466,649; 5,470,811; 5,470,927; 5,477,895; 5,491,205; and, 5,491,207, the contents of which are incorporated by reference herein.

When employing the foregoing metallocene procatalyst and the cocatalyst is entirely an aluminoxane, ligand ($Cp^1R^1_m$) is preferably different from ligand ($Cp^2R^2_p$), and bridging group $R^3$ preferably contains at least two bulky groups. Of these bridged metallocenes, it is preferred that a bridging group $R^3$ possess the structure:

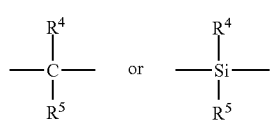

(II)

wherein each of bulky groups $R^4$ and $R^5$, independently, is, or contains, a cyclohydrocarbyl group containing up to 20 and preferably from 6 to 12 carbon atoms and from 0 to 3 heteroatoms such as oxygen, sulfur, tertiary nitrogen, boron or phosphorus and, in particular, is a cycloalkyl, heterocycloalkyl, cycloalkenyl, heterocycloalkenyl, aryl, heteroaryl, alkaryl, alkylheteroaryl, aralkyl, heteroarallyl, and the like. M in the compound of formula (I) is titanium, zirconium or hafnium, q is 2 and each X is halogen.

Of this preferred group of bridged metallocenes, those in which ligand ($Cp^1R_m^1$) is substituted or unsubstituted cyclopentadienyl, ligand ($Cp^2R_p^2$) is indenyl or fluorenyl, M is zirconium, $R^4$ and $R^5$ each is substituted or unsubstituted phenyl and each X ligand is chlorine are particularly preferred.

Exemplary bridged metallocenes of the formula (I) that can be used in the polymerization process of the embodiments of the present invention include, without limitation: diphenylmethylene (indenyl)(fluorenyl)zirconium dichloride, diphenylmethylene (cyclopentadienyl)(4,5,6,7-tetrahydro-indenyl) zirconium dichloride, diphenylmethylene (cyclopentadienyl) (2-methylindenyl)zirconium dichloride, diphenylmethylene (2,4-dimethylcyclo-pentadienyl)(3',5' dimethylcyclopentadienyl)zirconium dichloride, diphenylmethylene(2-methyl-4-tert-butylcyclo-pentadienyl)(3'-tert-butyl-5methylcyclopentadienyl)zirconium dichloride, dixylylmethylene (2,3,5-trimethylcyclopentadienyl)(2',4,5'-trimethylcyclopentadienyl)zirconium dichloride, dixylylmethylene(2,4-dimethylcyclopentadienyl)(3',5'-dimethylcyclopentadienyl)zirconium dichloride, dixylylmethylene (2-methyl-4-tert-butylcyclopentadienyl)(3'-tert-butyl-5-methylcyclopentadienyl)zirconium dichloride, dixylylmethylene (cyclopentadienyl)(fluorenyl) zirconium dichloride, di-o-tolylmethylene (cyclopentadienyl)(3,4-dimethyl-cyclopentadienyl) zirconium dichloride, di-o-tolylmethylene (cyclopentadienyl)(3,4-dimethyl-cyclopentadienyl) zirconium dichloride, di-o-tolylmethylene (cyclopentadienyl)(3,4-dimethylcyclopentadienyl) zirconium dichloride, di-o-tolylmethylene (cyclopentadienyl)(indenyl)zirconium dichloride, dibenzylmethylene (cyclopentadienyl)(tetramethylcyclopentadienyl)zirconium dichloride, dibenzylmethylene (cyclopentadienyl)(indenyl)zirconium dichloride, dibenzylmethylene (cyclopentadienyl)(fluorenyl)zirconium dichloride, dicyclohexylmethylene (cyclopentadienyl) (indenyl)zirconium dichloride, dicyclohexyl(cyclopentadienyl)(fluorenyl)zirconium dichloride, dicyclohexylmethylene(2-methylcyclopentadienyl)(fluorenyl)zirconium dichloride, diphenylsilyl(2,4-dimethylcyclopentadienyl)(3',5-dimethylcyclopentadienyl)zirconium dichloride, diphenylsilyl(2,4-dimethylcyclopentadienyl)(3',5'-dimethylcyclopentadienyl) zirconium dichloride, diphenylsilyl (2,3,5-trimethylcyclopentadienyl) (2,4trimethylcyclopentadienyl)zirconium dichloride, tetraphenyldisilyl(cyclopentadienyl) (indenyl) zirconium dichloride, tetraphenyldisilyl(3-methylcyclopentadienyl)(indenyl) zirconium dichloride, tetraphenyldisilyl (cyclopentadienyl)(fluorenyl)zirconium dichloride, di-o-tolylsilyl (cyclopentadienyl)(trimethylcyclopentadienyl) zirconium dichloride, di-o-tolylsilyl (cyclopentadienyl) (tetramethylcyclopentadienyl)zirconium dichloride, di-o-tolylsilyl (cyclopentadienyl)(3,4-diethylcyclopentadienyl) zirconium dichloride, di-o-tolylsilyl (cyclopentadienyl) (triethylcyclopentadienyl)zirconium dichloride, dibenzylsilyl (cyclopentadienyl)(fluorenyl)zirconium dichloride, dibenzylsilyl(cyclopentadienyl)(2,7-di-t-butyl-fluorenyl)zirconium dichloride, dicyclohexylsilyl(cyclopentadienyl)(fluorenyl) zirconium dichloride, and diphenylmethylene (cyclopentadienyl-9-fluorenyl)zirconium dichloride.

In a preferred embodiment, the polymerizing occurs in the presence of a catalyst having the formula $Ph_2C(Cp$-9-Flu$)ZrCl_2$ (diphenylmethylene (cyclopentadienyl-9-fluorenyl) zirconium dichloride, also referred to herein as CpFlu), which is represented by the following structure.

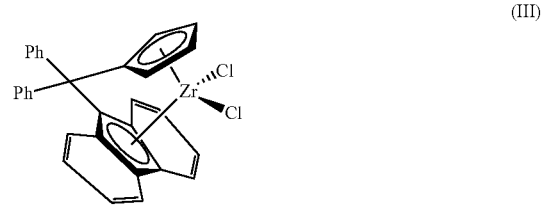

(III)

The cocatalyst, or activator, employed with the metallocene procatalysts of formula (I) can be any of the aluminoxanes known to activate metallocene procatalysts. Exemplary aluminoxane cocatalysts include alkylaluminoxanes such as methylaluminoxane (MAO). See, e.g., U.S. Pat. No. 5,229,478, the entirety of which is incorporated by reference as if fully set forth herein.

In general, the bridged metallocene procatalyst can be present in the reaction vessel in an amount, expressed in terms of its transition metal content, of from 0.0001 mmol/L to 5 mmol/L, e.g., from 0.0001 mmol/L to 0.09 mmol/L, from 0.001 to mmol/L to 0.05 mmol/L, 0.002 mmol/L to 0.05 mmol/L, 0.01 to mmol/L to 0.05 mmol/L, from 0.015 mmol/L to 0.03 mmol/L, and preferably about 0.025 mmol/L.

Corresponding to these amounts of transition metal, the aluminoxane cocatalyst can be utilized in an amount in the reaction vessel of from about 0.002 mmol/L to about 50 mmol/L, preferably from about 0.002 mmol/L to about 25 mmol/L and more preferably from about 0.02 mmol/L to about 10 mmol/L. The optimum levels of bridged metallocene procatalyst and aluminoxane cocatalyst will, to some extent, depend upon the specific procatalyst and cocatalyst selected as well as other polymerization process variables.

In terms of levels of aluminoxane cocatalyst to metallocene procatalyst in the reaction vessel, the molar ratios can be, for example, about 1000:1, about 750:1, about 500:1, about 250:1, about 100:1, about 50:1, or about 25:1. In some embodiments, the level of metallocene procatalyst to aluminoxane cocatalyst is preferably 500:1. In other embodiments, the level of metallocene procatalyst to aluminoxane cocatalyst is preferably 100:1. In still other embodiments, the level of metallocene procatalyst to aluminoxane cocatalyst is preferably 25:1. In terms of ranges, the molar ratio of the aluminoxane cocatalyst to the metallocene catalyst optionally is from 25:1 to 3000:1, e.g., 25:1 to 1000:1, or 250:1 to 1000:1. When $C_8$-$C_{12}$ saturated hydrocarbons and/or hydrocarbons having a vapor pressure within 20% of the α-olefin are fed to the reaction system, the preferred molar ratio of aluminoxane cocatalyst to metallocene catalyst is from about 50:1 to about 1000:1, e.g., from about 200:1 to about 800:1, and most preferably about 300:1. Higher ratios are generally desired for polymerization reaction systems in which hydrocarbons are not fed to the reaction system.

When employing an aluminoxane cocatalyst, it can be advantageous to include a trialkylaluminum compound such as trimethylaluminum, triethylaluminum, tri(n-propyl) aluminum, triisopropylaluminum, tri(n-butyl)aluminum, triisobutylaluminum, and the like, to reduce the amount of aluminoxane required for suitable activation of the metallocene procatalyst. In general, the optional trialkylaluminum can be utilized in a molar level to metallocene procatalyst of from about 1 to about 1000 and preferably from about 2 to about 500.

It is also contemplated that a neutral or anionic metalloid-containing component can optionally be employed with the aluminoxane cocatalyst in activating the metallocene procatalyst. Exemplary neutral metalloid-containing components include boranes such as perfluoroarylborane compounds, e.g., tris(pentafluorophenyl)borane, tris (methoxyphenyl) borane, tris(trifluoromethylphenyl)borane, tris(3,5-di[trifluoro-methyl]phenyl)borane, tris (tetrafluoroxylyl)borane, tris(tetrafluoro-o-tolyl)borane, and the like. Of the foregoing boranes, tris(pentafluorophenyl)borane and tris(3,5-di[trifluoromethyl]phenyl)borane are preferred. Other useful second components include aluminum homologues of the foregoing compounds.

Exemplary anionic metalloid-containing components include borates such as perfluoroaryl borates, e.g., lithium tetrakis(pentafluorophenyl)borate, lithium tetrakis (trifluoromethylphenyl)borate, lithium tetrakis(3,5-di[tri-fluoromethyl]phenyl)borate, sodium tetrakis(pentafluoro-phenyl)borate, potassium tetrakis(pentafluorophenyl)borate, magnesium tetrakis(pentafluorophenyl)borate, titanium tetrakis(pentafluorophenyl)borate, tin tetrakis (pentafluorophenyl)borate, dimethylanilinium tetrakis(pentafluorophenyl)borate and the like. Of the foregoing borates, dimethylaniliniumtetrakis(pentafluorophenyl)borate and alkali metal borates such as lithium tetrakis(pentafluorophenyl)borate and lithium tetrakis(3,5-di[trifluoro-methyl]phenyl)borate are preferred. In some embodiments, aluminate homologues of the foregoing compounds may be used.

In general, neutral or anionic metalloid-containing components can be utilized in a molar level to metallocene procatalyst of about 1:2, about 1:1.5, about 1:1, or about 1:0.5. When the anionic metalloid-containing component is dimethylaniliniumtetrakis(pentafluorophenyl) borate, the level of the borate to the metallocene procatalyst is 1:1.

Activation of the metallocene to yield an activated metallocene catalyst composition can be achieved by combining the aforementioned metallocene procatalysts with the aluminoxane cocatalyst, optionally in the presence of a neutral or anionic metalloid-containing component, either simultaneously or in any sequence and with any interval of time therebetween and either in the presence of, or in the absence of, the olefin monomer(s) and hydrogen. The activation optionally occurs at a temperature ranging from 0 to 100° C., and optionally for a time period ranging from 1 minute to 72 hrs. Optionally, activation occurs in from 0 to 99% of an inert hydrocarbon solvent, either aliphatic or aromatic. In a preferred embodiment, the metallocene catalyst is activated for 10 minutes at room temperature and with toluene as solvent.

In some embodiments, the activated metallocene catalyst compositions is prepared in advance and thereafter the composition is introduced into the polymerization reactor with the olefin monomer (s), optionally in the presence of hydrogen.

The reaction of the metallocene procatalyst with the aluminoxane cocatalyst to generate an activated metallocene catalyst preferably is conducted at a temperature ranging from about 0 to about 100° C., e.g., from about 0 to about 80° C., from about 10 to about 50° C., or from about 25 to about 50° C.; for a time period of from about 1 minute to about 72 hours, e.g. from about 1 minute to about 50 hours, from about 1 minute to about 30 hours, or from about 1 minute to about 24 hours.

Process Parameters

The polymerization processes of the invention may be carried out in any known manner, e.g., in the liquid phase, i.e., in a solution or slurry process, or in a suspension process, either continuously, semi-continuously, or in batch. These processes are generally carried out at temperatures in the range of from about 105° C. to about 170° C., preferably from 110° C. to 150° C., from 120° C. to 140° C., and preferably about 130° C. (lower temperatures are generally desired for polymerization reaction processes). The pressure within the reaction vessel optionally ranges from 0 to 3000 psig (0 to 20700 kPag), e.g., from 0 to 600 psig (0 to 4100 kPag) or from 10 to 240 psig (70 to 1700 kPag). Other preferred pressures range from 0 to 4240 kPag, e.g., 1.7 to 1760 kPag or from 520 to 720 kPag. Pressures greater than 1500 kPag are generally desired for conventional polymerization reaction processes. As one skilled in the art would readily appreciate, control of the polymerization temperature has a direct bearing on the quality of the polymerization, e.g., activity, as well as the final product properties, e.g., Iodine Number. However, as these temperatures approach 150° C. or greater, the exothermic temperature, i.e., the maximum temperature reached during the polymerization, should be substantially close to the initial polymerization temperature, e.g., at temperatures above about 150° C. the exothermic temperature should be no more than about 20° C. greater than the initial polymerization temperature.

The polymerization can be carried out in liquid monomer and in the absence of solvent or, if desired, in the presence of solvent. In this context, the term "solvent" refers to a non-reactive liquid other than the $C_8$-$C_{12}$ saturated hydrocarbon of the first embodiment or the hydrocarbon of the second embodiment. Dilution solvents that can be employed include straight and branched chain hydrocarbons, such as butanes, pentanes, hexanes, heptanes, and the like, cyclic and alicyclic hydrocarbons, such as cyclopentane, cyclohexane, cycloheptane, methyl-cyclopentane, methylcyclohexane, methylcycloheptane, and the like, and alkyl-substituted aromatic compounds, such as toluene, xylene, and the like, and mixtures of the foregoing.

Preferably, the polymerization process is a continuous or semi-continuous polymerization reaction process, meaning that monomer is continuously or semi-continuously fed to the reaction vessel and product is continuously or semi-continuously removed from the reaction vessel. This aspect of the invention is described in greater detail below with reference to FIGS. 1-3. In these aspects, the PAO preferably has a residence time in the reaction vessel on the order of from 5 to 300 minutes, e.g., 10 to 60 minutes, 15 to 45 minutes, or 20 to 40 minutes.

Surprisingly and unexpectedly, it has been discovered that the residence time of the PAO in the reaction vessel has an inverse impact on the viscosity of the resulting PAO that is formed. Specifically, it has been discovered that when the reaction system is operated at greater residence times, the kinematic viscosity of the resulting PAO is reduced relative to PAO formed at lower residence times. Thus, in the fifth embodiment, the invention is to a process for forming a PAO in which the kinematic viscosity of the PAO is controlled based on the residence time of the PAO in the reaction vessel. The process comprises the step of polymerizing in a reaction vessel a $C_8$-$C_{12}$ α-olefin in the presence of hydrogen, and a catalytically effective amount of a catalyst system under conditions effective to form the PAO, wherein the PAO has an average residence time in the reaction vessel of greater than 5 minutes, and the PAO has a kinematic viscosity of no more than 200 cSt. In a preferred embodiment, the PAO has an average residence time in the reaction vessel of greater than 10 minutes, and the PAO has a kinematic viscosity of no more than 150 cSt. In an even more preferred embodiment, the PAO has an average residence time in the reaction vessel of greater than 25 minutes, and the PAO has a kinematic viscosity of no more than 125 cSt.

In another embodiment, the process is a batch polymerization process. A typical batch solution polymerization process can be carried out by first introducing the α-olefin monomer, e.g., a $C_8$-$C_{12}$ α-olefin monomer such as 1-decene, either alone or in combination with an optional hydrocarbon solvent, e.g., hexanes, xylenes, etc., into a stirred tank reactor. The $C_8$-$C_{12}$ saturated hydrocarbon of the first embodiment, e.g., one or more decanes, or the hydrocarbon of the second embodiment (having a 50° C. vapor pressure within 20%, e.g., within 10% or within 5%, of the vapor pressure of the pure α-olefin monomer) can be fed either sequentially or simultaneously with the α-olefin monomer. A minor amount of an inert impurity scavenger, e.g., the aforementioned tri-alkylaluminum compounds, can also be fed at this time. The reactor is then brought up to the desired temperature, e.g., from about 0° C. to about 200° C., from about 50° C. to about 150° C., or from 80° C. to 140° C., and a measured amount of hydrogen can then be introduced into the stirred tank reactor. If copolymerization is desired with a gaseous monomer, a minor monomer feed comprising the minor monomer, for example, ethylene or 1-propene, may be sparged into the liquid phase, either in combination with, or separate from the hydrogen feed.

Once the desired conditions are established, a hydrocarbon solution of the catalyst in the required amount is then fed to the liquid phase in the reactor. In this aspect, the hydrocarbon solution optionally comprises the $C_8$-$C_{12}$ saturated hydrocarbon of the first embodiment or the hydrocarbon of the second embodiment. In another aspect, the hydrocarbon solution comprises toluene. Although high levels of toluene may result in decreased selectivity, a small amount of toluene, e.g., less than 7 weight percent, less than 5 weight percent, less than 2 weight percent or less than 1 weight percent toluene, based on the total weight of the feedstock, has been found to be generally tolerable in the polymerization reaction processes of the present invention. Other aliphatic and aromatic solvents, such as a xylene and benzene, may have a similar effect on selectivity. The rate of polymerization is controlled, among other factors, by the concentration of the catalyst and monomers present or fed during polymerization. The reactor temperature is preferably controlled by means of cooling coils, agitation, etc., and the initial total pressure in the reactor may be maintained by a constant flow of hydrogen, inert gas, gaseous monomers or a combination thereof. After polymerization is complete, the reactor is depressurized and the catalyst is deactivated by conventional means.

Depending on the amount of monomer conversion and viscosity of the reactor contents, a hydrocarbon solvent (in addition to the $C_8$-$C_{12}$ saturated hydrocarbon of the first embodiment or the hydrocarbon of the second embodiment) can be added to aid in removing the product polyolefin from the reactor. Spent catalyst components can be isolated from the reaction product via mixing with, e.g., alcohol, water, or a mixture of both, and then by phase separation of the hydrocarbyl component from the aqueous component. The liquid PAO can then be recovered from the hydrocarbyl component by conventional methods, e.g., evaporation, distillation, etc., and then further processed as desired.

Since water, even in small amounts, is highly undesirable in the polymerization reaction vessel, in those embodiments of the invention in which the $C_8$-$C_{12}$ saturated hydrocarbon of the first embodiment or the hydrocarbon of the second embodiment is derived from the crude PAO product and recycled to the reaction vessel, as described above, the spent catalyst components preferably are not isolated via mixing with an aqueous phase. Instead, for example, the spent catalyst (e.g., metallocene catalyst, co-catalyst and optional activator) may be separated from the crude PAO product stream by contacting the crude PAO product stream, which contains the spent catalyst, with one or more solid adsorbent materials capable of selectively adsorbing the catalyst thereto.

The contacting preferably occurs in a catalyst removal column—particularly when the polymerization process is a continuous or semi-continuous process. The catalyst removal column preferably is packed with the solid adsorbent material. The crude PAO product stream may be allowed to flow in an upward direction or a downward direction, at an angle, or in a horizontal direction. A non-limiting list of exemplary solid adsorbent materials includes acidic clay, zeolites, calcium oxide, magnesium oxide, silicates and mixtures thereof.

Other metal oxides may also be used. The solid adsorbent material may have a volume average particle size (diameter for generally spherical particles) ranging, for example, from 50 µm to 2 cm, e.g., from 100 µm to 1 cm, or from 250 µm to 1000 µm, and a bulk density that maintains a reasonable pressure drop (e.g., <200 psi (<1379 kPa)). The recycle of saturated hydrocarbon to the reaction vessel is highly desirable in those embodiments of the invention that employ a catalyst removal column because the saturated hydrocarbon reduces the viscosity of the crude PAO product stream such that the crude PAO product is capable of passing through the solid adsorbent material. In the absence of the saturated hydrocarbon recycle (or the presence of an alternative solvent system), the high viscosity of the resulting PAO product stream may preclude the use of the inventive catalyst removal column. Thus, the saturated hydrocarbon recycle preferably is employed together with the inventive catalyst removal column.

The amount of solid adsorbent contained in the column will vary depending, for example, on the adsorbent used, particle size and distribution, and the flow rate. In some exemplary embodiments, the weight ratio of adsorbent employed to PAO to be processed ranges from 0.005:1 to 0.5:1, e.g., from 0.01:1 to 0.25:1, or from 0.01:1 to 0.1:1, and most preferably is about 0.05:1. The temperature of the column may range, for example, from about room temperature to about 125° C. or higher.

As the catalyst removal column is used, the flow rate of the PAO product stream through the column gradually will tend to slow. Accordingly, the pressure of the PAO to the column may be gradually increased to offset the gradual plugging of the column. The PAO pressure to the column may range, for example, from about 10 psig (172 kPag) for a fresh column to about 200 psig (1379 kPag) for a more used column, e.g., from about 25 psig (172 kPag) to about 200 psig (1379 kPag) or from about 100 psig (689 kPag) to about 200 psig (1379 kPag). At some point, it may be necessary to temporarily stop the flow of catalyst to the column in order to allow the spent adsorbent to be replaced with fresh adsorbent. The spent adsorbent may be disposed of or regenerated and reused.

For batch processes, the solid adsorbent material may be added directly to the crude PAO product, e.g., as a powder, and then filtered to remove the solid adsorbent material and the catalyst that is adsorbed thereon and thereby form a reduced catalyst PAO stream.

As indicated above, the processes of the present invention preferably provide significantly improved selectivity and yield over conventional PAO synthesis processes, while maintaining high conversion. For example, the overall conversion of the polymerization processes of the present invention may be greater than 85 percent, e.g., greater than 90 percent, greater than 95 percent or greater than 99 percent. Conversion refers to amount of α-olefins that are converted during the polymerization process to saturated monomers, PAO, or any other byproducts. Conversion percentage is calculated by dividing the weight of the α-olefins reacted by the weight of the α-olefins fed to the system. Selectivity, according to the processes of the invention, preferably is maintained at a high level, e.g., at least 90 percent, at least 95 percent, at least 97 percent or at least 99 percent. As used herein, "selectivity" refers to the percent of converted α-olefins that are converted to PAO (on a weight basis). A higher selectivity indicates a higher production of the desired PAO relative to non-PAO products. Similarly, the overall yield for the polymerization processes of the present invention may, for example, be greater than 75 percent, e.g., greater than 80 percent, greater than 85 percent, greater than 90 percent or greater than 95 percent. Yield percentage is calculated by multiplying conversion by selectivity. In one embodiment, the selectivity is greater than 90 percent, the yield is greater that 75 percent and the conversion is greater than 85 percent. In still other embodiments, a PAO produced by the present invention may have the percentages defined by any combination of the above-identified ranges for selectivity, yield and conversion.

Polyalphaolefins and Applications

The PAO polymers that can be obtained by the polymerization processes described herein are preferably substantially amorphous. In addition to being substantially amorphous, the PAO polymers that can be obtained by the polymerization process herein possess a unique combination of low weight average molecular weight ($M_w$), low polydispersity index ($M_w/M_n$, where $M_n$ is number average molecular weight), controllable kinematic viscosity ($Kv_{100}$), high viscosity index (VI), low Iodine Number ($I_2\#$), i.e., a substantially saturated PAO, and low glass transition temperature ($T_g$) that distinguish them from known PAOs. The novel PAO polymers possess a $M_w$ of from about 500 to about 80,000, e.g., from about 750 to about 60,000, from about 1,000 to about 40,000, from about 1,000 to about 10,000, or from about 2,500 to about 7,500, a $M_w/M_n$ of from about 1.0 to about 10, preferably from about 1.5 to about 5, more preferably from about 1.75 to about 4, an Iodine Number of from about 0.0 to about 10, preferably from about 0.1 to about 5, more preferably from about 0.2 to about 3, and a $T_g$ of below about −20° C., preferably below about −30° C., more preferably below about −40° C. Unless otherwise specified, molecular weights provided herein are determined through gel permeation chromatography using polystyrene standards.

The PAO formed by the processes of the present invention preferably has a particularly low kinematic viscosity. In various exemplary embodiments, the $Kv_{100}$ may range from about 10 to about 10,000 cSt, e.g., from about 20 to about 7,500 cSt, or from about 25 to about 5,000 cSt. In more preferred aspects, the $Kv_{100}$ may range from 50 to 500 cSt, e.g., from 50 to 150 cSt, from 90 to 120 cSt or from 95 to 115 cSt. Unless otherwise indicated, kinematic viscosity is determined according to ASTM D-445, the entirety of which is incorporated herein by reference. The PAO preferably has a VI ranging from 120 to 500, e.g., from 170 to 200, as determined by ASTM D-2270, the entirety of which is incorporated herein by reference.

These advantageous properties can be exploited in a variety of products such as, for example, products which require a viscous oil or an inert material with fluid properties such as dispersants, heat transfer fluids, cosmetics, or other such consumer products, and the like.

In one embodiment, the PAO structure has a predominately head-to-tail configuration, where 70% or more of the α-olefin monomers are joined in a head to tail manner, e.g. 80% or more or 90% or more. A head-to-tail configuration is the result of a 1-2 addition, where the first carbon atom of a first monomer (head) is bonded to the second carbon in a second monomer (tail). In one embodiment, the PAO structure has a low head-to-head or tail-to-tail configuration where less than 30% of the monomers are either head-to-head or tail-to-tail, e.g. less than 20% or less than 10%. The predominately head-to-tail configuration of PAOs produced by the present invention may have a peak in the region of 41-40 ppm in a $^{13}C$ Nuclear Magnetic Resonance (NMR) analysis. In addition, a low head-to-head configuration may have no discernible peak in the region of 42.5 ppm and a low tail-to-tail configuration may have no discernible peak in the region of 21-20 ppm. By "no discernible peak" it is meant that that the relative content or peak integral in the respective region is less than 1.0%, e.g. less than 0.5% or less than 0.1 of the total peak integral. A low head-to-head or tail-to-tail configuration indicates that there are few misinsertions or rearrangements in the PAO structure. In one embodiment the low head-to-head or tail-to-tail configuration indicates that there are no misinsertions or rearrangements in the PAO structure.

In addition to a predominately head-to-tail configuration, PAOs of the present invention typically have low isotacticity. Isotacticity may be determined using $^{13}$C NMR analysis based on the relative content or peak integral in a region that corresponds to mm triads. The relative content of isotactic structure is equivalent to the mole percent of mm triads. The region of mm triads is from 35.50 to 34.96 ppm, and the region may include one or more pentads such as mmmm, mmmr, or rmmr. A low isotacticity PAO in accordance with an embodiment of the present invention has a mole % of mm triads of from 0.5 to 5.0, e.g., from 1.0 to 4.0, or from 1.5 to 3.0.

In addition to a predominately head-to-tail configuration, PAOs of the present invention typically have a very high degree of syndiotacticity. Syndiotacticity may be determined using $^{13}$C NMR analysis by the relative content or peak integral in a region that corresponds to rr triads. The relative content of syndiotactic structure is equivalent to the mole percent of rr triads. The region of rr triads is from 34.40 to 33.71 ppm, and the region may include one or more pentads such as rrrr, rrrm, or mrrm. The syndiotacticity of a PAO in accordance with an embodiment of the present invention has a mole % of rr triads from 40.0 to 58.0, e.g., from 42.0 to 55.0, or from 46.0 to 52.0 mole %.

PAOs of the present invention also may be atactic or heterotactic in addition to having a predominant head-to-tail configuration. Atacticity may be determined by the relative content of a region using $^{13}$C NMR analysis that corresponds to mr triads. The relative content of atactic structure is equivalent to the mole percent of mr triads. The region of mr triads is from 34.96 to 34.40 ppm, and the region may include one or more pentads such as mmrr, mmrm, rmrr or rmrm. The atacticity of a PAO in accordance with an embodiment of the present invention has a mole % of mr triads from 37.0 to 59.5, e.g., from 40.0 to 55.0 mole % or from 45.0 to 50.0 mole %.

In one embodiment, the PAO structure may have the following tacticities: 0.5 to 5.0 mole % of mm triads and 40.0 to 58.0 mole % of rr triads. In another embodiment, the PAO structure may have the following tacticities: 0.5 to 5.0 mole % of mm triads, 40.0 to 58.0 mole % of rr triads and 37.0 to 59.5 mole % of mr triads. In still another embodiment, a PAO produced by the present invention may have tacticities defined by any combination of the above-identified ranges for mm, mr or rr triads.

Additionally, the products of this invention can be used in grafting applications to produce functionalized low molecular weight polymers. The PAO polymers of this invention are particularly useful as viscosity modifiers for lubricants, especially lubricating oils, wherein the polymer is employed in a viscosity-modifying amount. Concentrations of from about 1 to about 99 weight percent based on the total weight of the lubricant composition can be used. Preferably, the concentration is from about 5 to about 85 weight percent.

In general, mineral oils, both paraffinic, naphthenic and mixtures thereof, including those oils defined as American Petroleum Institute Groups I, II, and III can be employed as the lubricant vehicle, and can be any suitable lubricating viscosity range, as, for example, from about 2 cSt at 100° C. to about 1,000 cSt at 100° C., preferably from about 2 to about 100 cSt at 100° C. These oils can have viscosity indices preferably ranging to about 180. The average molecular weights of these oils can range from about 250 to about 800.

Where synthetic oils are employed, they can include, but are not limited to, polyisobutylene, polybutenes, hydrogenated polydecenes, polypropylene glycol, polyethylene glycol, trimethylpropane esters, neopentyl and pentaerythritol esters, di(2-ethylhexyl)sebacate, di(2-ethylhexyl)adipate, dibutyl phthalate, fluorocarbons, silicate esters, silanes, esters of phosphorus-containing acids, liquid ureas, ferrocene derivatives, hydrogenated synthetic oils, chain-type polyphenyls, siloxanes and silicones (polysiloxanes), alkylsubstituted diphenyl ethers typified by a butyl-substituted bis(p-phenoxy phenyl)ether, and phenoxy phenylethers.

The lubricant compositions can also contain one or more other materials, for example, detergents, corrosion inhibitors, oxidative inhibitors, dispersants, pour point dispersants, antifoaming agents, anti-wear agents, other viscosity modifiers, friction modifiers, and the like at the usual levels in accordance with well known practice. Other materials, including extreme pressure agents, low temperature properties modifiers, and the like, can also be used, as exemplified, respectively, by metallic phenates or sulfonates, polymeric succinimides, non-metallic or metallic phosphorodithioates, and the like, at the usual levels in accordance with well known practice. These materials do not detract from the value of the compositions of this invention, but rather serve to impart their customary properties to the particular compositions in which they are incorporated.

In one aspect, the low viscosity PAOs of the invention may be blended with one or more higher viscosity materials as described, for example, in U.S. Publ. Pat. Appl. Nos. US 2006/0276355 A1, US 2007/0298990 A1, US 2007/0289897 A1, US 2008/0020954 A1, and WO 2007/145924 A1 and WO 2007/146081, the entireties of which are incorporated herein by reference.

Reaction System

In another embodiment, the invention is to a reaction system for performing the above-described processes of the present invention. FIG. 1 illustrates a flow diagram of an exemplary reaction system 100 according to one aspect of the second embodiment of the invention. As shown, reaction system 100 comprises a reaction vessel 101, a catalyst removal unit 102, and a separation zone 103.

As shown, monomer-containing feedstock 104, hydrogen feedstock 106 and catalyst feed 105, are directed to reaction vessel 101. The monomer-containing feedstock 104 comprises an α-olefin (e.g., a $C_8$-$C_{12}$ α-olefin monomer such as 1-decene), a hydrocarbon (e.g., a $C_8$-$C_{12}$ saturated hydrocarbon such as one or more decanes or a hydrocarbon having a 50° C. vapor pressure within 20%, e.g., within 10% or within 5%, of the α-olefin), optionally one or more minor monomers and optionally a solvent. In this embodiment, the hydrocarbon may, for example, be a commercially available hydrocarbon. As indicated above, the hydrocarbon preferably has the same number of carbon atoms as the α-olefin. The catalyst feed 105 comprises a catalyst system, which preferably comprises a polymerization catalyst (preferably a metallocene procatalyst), a suitable co-catalyst (preferably an aluminoxane such as MAO), and optionally an anionic metalloid-containing component (e.g., a borane or a borate), as described above. The catalyst feed 105 may also include a catalyst solvent, such as toluene. Hydrogen feedstock 106 comprises hydrogen gas. Hydrogen feedstock 106 may, for example, be sparged into reaction system 100. In another embodiment, not shown, the hydrogen may be added (e.g., bubbled or sparged) to the monomer-containing feedstock 104, which is then directed to reaction vessel 101. Reaction vessel 101 also preferably includes a vent line, not shown, for venting gaseous components therefrom.

In reaction vessel 101, the monomers contact the polymerization catalyst, the hydrocarbon, and the hydrogen under conditions effective to form the PAO, preferably a highly saturated PAO. The crude PAO product is yielded from the reaction vessel 101 via crude PAO stream 107, and directed to a catalyst separation unit 102. As shown, the catalyst separation unit comprises a catalyst removal column, which preferably is packed with one or more materials capable of deactivating the catalyst and preferably capable of selectively separating the catalyst from the crude PAO product to form a reduced catalyst PAO stream 108, which is directed to separation zone 103.

Separation zone 103 comprises one or more separation units, e.g., flash vessels, evaporators, strippers, distillation columns, etc., capable of separating the PAO product from the other components contained in reduced catalyst PAO stream 108. As shown, separation zone 103 separates the reduced catalyst PAO stream 108 into one or more byproduct streams 109 (one is shown) and a purified PAO product stream 110.

Figure 2:
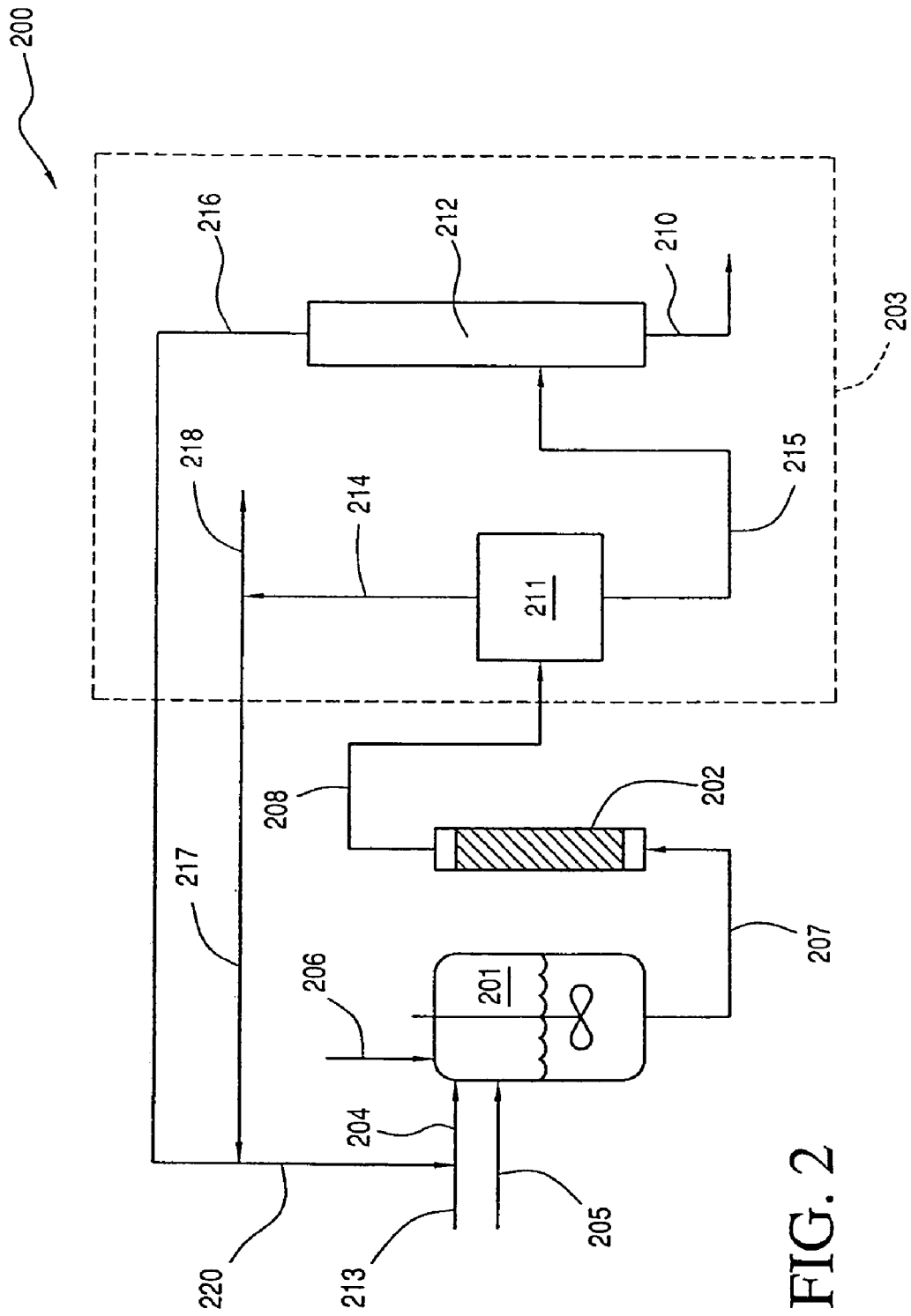
FIG. 2 is an exemplary flow diagram of a reaction system for forming PAO according to another embodiment of the invention.

In another aspect, as discussed above, hydrocarbons are separated from the crude PAO product and recycled to the reaction vessel. FIG. 2 provides a flow diagram of an exemplary reaction system 200 according to this aspect of the invention. As shown, reaction system 200 comprises a reaction vessel 201, a catalyst removal unit 202, and a separation zone 203. As shown, separation zone 203 comprises a flash vessel 211 and a separation unit 212.

As shown, an initial monomer-containing feedstock 213 is combined with a recycle stream 220 comprising a hydrocarbon, e.g., a $C_8$-$C_{12}$ saturated hydrocarbon, to form combined monomer-containing feedstock 204. Recycle stream 220 also may comprise unreacted monomer. Combined monomer-containing feedstock 204, hydrogen feedstock 206 and catalyst feed 205 are directed to reaction vessel 201. The combined monomer-containing feedstock 204 comprises an α-olefin (e.g., a $C_8$-$C_{12}$ α-olefin such as 1-decene), a hydrocarbon (e.g., a $C_8$-$C_{12}$ saturated hydrocarbon such as one or more decanes or a hydrocarbon having a 50° C. vapor pressure within 20%, e.g., within 10% or within 5%, of the α-olefin) derived from the crude PAO product, optionally one or more minor monomers and optionally a solvent. As indicated above, the hydrocarbon preferably has the same number of carbon atoms as the α-olefin. The catalyst feed 205 comprises a catalyst system, which preferably comprises a polymerization catalyst (preferably a metallocene procatalyst), a suitable co-catalyst (preferably an aluminoxane such as MAO), and optionally an anionic metalloid-containing component (e.g., a borane or a borate), as described above. The catalyst feed 205 may also include a catalyst solvent, such as toluene. Hydrogen feedstock 206 comprises hydrogen gas. In another embodiment, not shown, the hydrogen may be added to the monomer-containing feedstock 204, which is then directed to reaction vessel 201. Reaction vessel 201 also preferably includes a vent line, not shown, for venting gaseous components therefrom.

In reaction vessel 201, the α-olefin contacts the polymerization catalyst, the hydrocarbon, and the hydrogen under conditions effective to form the PAO, preferably a highly saturated PAO. Crude PAO product is yielded from the reaction vessel 201 via crude PAO stream 207 and is directed to a catalyst separation unit 202. As shown, the catalyst separation unit comprises a catalyst removal column, which preferably is packed with one or more materials capable of deactivating the catalyst and preferably separating the catalyst from the crude PAO product to form a reduced catalyst PAO stream 208, which is directed to separation zone 203.

In FIG. 2, separation zone 203 comprises flash vessel 211 and one or more separation units 212 (one is shown), e.g., flash vessels, evaporators, and/or distillation columns, and preferably is capable of efficiently separating the PAO product from the other components contained in reduced catalyst PAO stream 208. Separation zone 203 also preferably is capable of efficiently separating a weight majority of the hydrocarbon, e.g., a decane, from reduced catalyst PAO stream 208. As shown, separation zone 203 separates the reduced catalyst PAO stream 208 into first stage overhead stream 214, second stage overhead stream 216, and purified PAO product stream 210.

In the embodiment shown, reduced catalyst PAO stream 208 is directed to flash vessel 211, where a rough separation is made between the PAO product formed in the reaction process and the light components (e.g., unreacted monomer, the hydrocarbon and catalyst solvent) contained in reduced catalyst PAO stream 208. Specifically, flash vessel 211 forms first overhead stream 214 and first bottoms stream 215. First overhead stream 214 preferably comprises a weight majority, e.g., at least 80 weight percent, at least 95 weight percent, at least 98 weight percent or at least 99 weight percent of the hydrocarbons (e.g., the $C_8$-$C_{12}$ saturated hydrocarbon such as one or more decanes or a hydrocarbon having a 50° C. vapor pressure within 20%, e.g., within 10% or within 5%, of the α-olefin) contained in the reduced catalyst PAO stream 208. First overhead stream 214 also preferably comprises a weight majority, e.g., at least 80 weight percent, at least 95 weight percent, at least 98 weight percent or at least 99 weight percent of the unreacted monomer contained in the reduced catalyst PAO stream 208. If the catalyst from catalyst feed 205 contained a catalyst solvent, e.g., toluene, then the first overhead stream 214 may also comprise a weight majority, e.g., at least 80 weight percent, at least 95 weight percent, at least 98 weight percent or at least 99 weight percent of the catalyst solvent contained in the reduced catalyst PAO stream 208. First bottoms stream 215 preferably comprises a weight majority, e.g., at least 80 weight percent, at least 95 weight percent, at least 98 weight percent or at least 99 weight percent of the PAO contained in the reduced catalyst PAO stream 208. Preferably, first overhead stream 214 is separated into a first aliquot portion 217 and a second aliquot portion 218. Second aliquot portion 218 is removed from the reaction system 200 as a purge stream in order to avoid the undesirable build up of light contaminants in the reaction system.

First bottoms stream 215 is then directed to separation unit 212, where a second separation is made between the PAO product and any light components (e.g., unreacted monomer, the hydrocarbons and catalyst solvent) contained in first bottoms stream 215. Specifically, separation unit 212 forms second overhead stream 216 and purified PAO product stream 210. Second overhead stream 216 preferably comprises a weight majority, e.g., at least 80 weight percent, at least 95 weight percent, at least 98 weight percent or at least 99 weight percent of the hydrocarbon (e.g., the $C_8$-$C_{12}$ saturated hydrocarbon such as one or more decanes or the hydrocarbon having a 50° C. vapor pressure within 20%, e.g., within 10% or within 5%, of the α-olefin) contained in the first bottoms stream 215. As described above with reference to first overhead stream 214, an aliquot portion, not shown, of second overhead stream 216 may be removed from the reaction system 200 as a purge stream. Purified PAO product stream 210 preferably comprises a weight majority, e.g., at least 80 weight percent, at least 95 weight percent, at least 98 weight percent or at least 99 weight percent of the PAO contained in the first bottoms stream 215. Ideally, purified PAO product stream 210 comprises substantially pure PAO product.

In the embodiment of FIG. 2, the first aliquot portion 217 of first overhead stream 214 is combined with second overhead stream 216 to form recycle stream 220, which is added to initial monomer-containing stream 213 to form combined monomer-containing feedstock 204. In this manner, hydrocarbons and unreacted monomer from first overhead stream 214 and second overhead stream 216 are recycled to reaction vessel 201, surprisingly and unexpectedly resulting in improved overall selectivity and yield.

Figure 3:
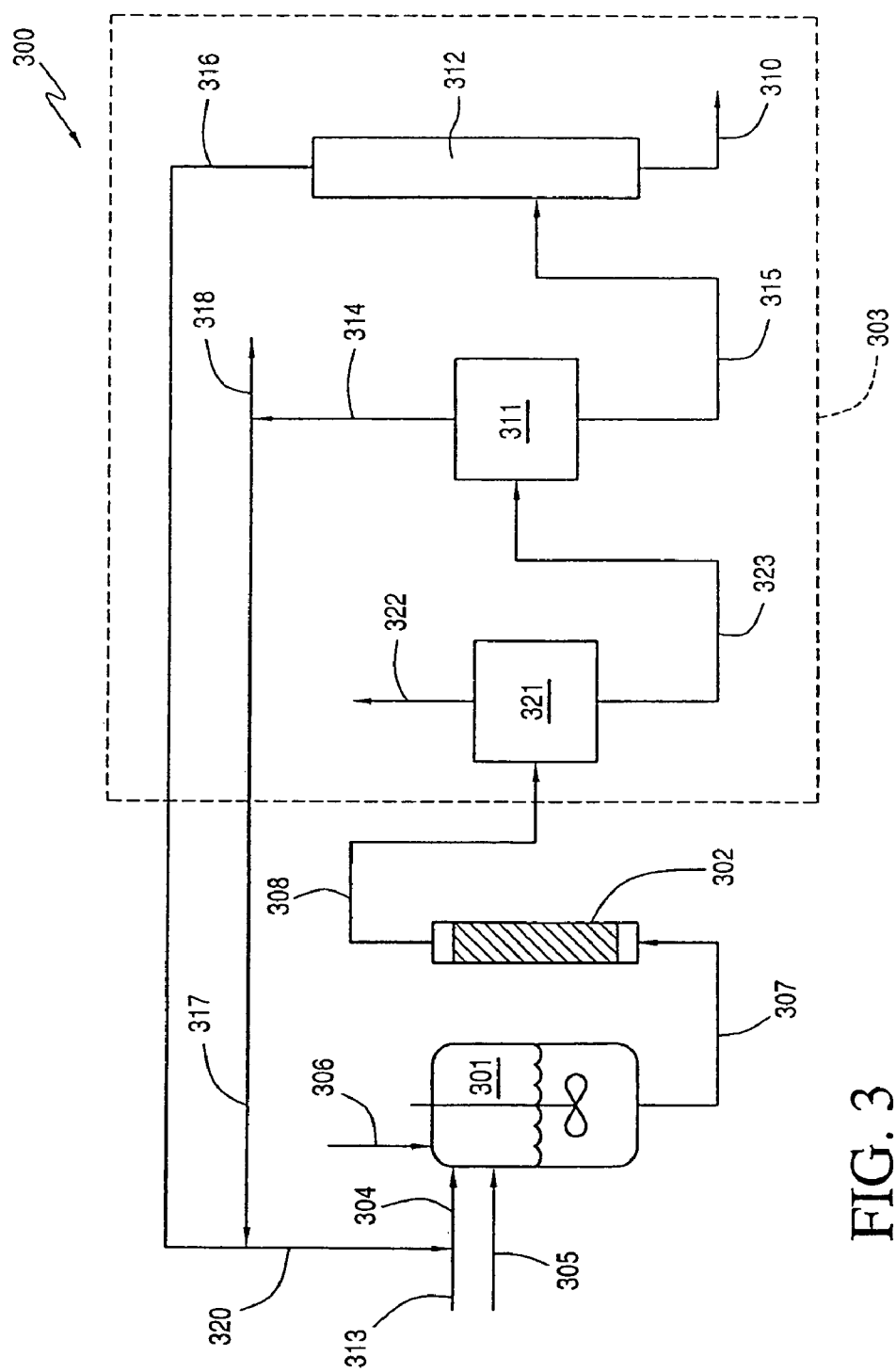
FIG. 3 is an exemplary flow diagram of a reaction system for forming PAO according to another embodiment of the invention.

In another aspect, additional separation steps are employed in order to remove undesirable light components, e.g., catalyst solvent, from the crude PAO product, while recycling the hydrocarbon (e.g., the $C_8$-$C_{12}$ saturated hydrocarbon such as one or more decanes or a hydrocarbon having a 50° C. vapor pressure within 20%, e.g., within 10% or within 5%, of the α-olefin) from the crude PAO product to the reaction vessel. FIG. 3 provides a flow diagram an exemplary reaction system 300 according to this aspect of the invention. As shown, reaction system 300 comprises a reaction vessel 301, a catalyst removal unit 302, and a separation zone 303. As shown, separation zone 303 comprises a first flash vessel 321, a second flash vessel 311 and a separation unit 312.

As shown, an initial monomer-containing feedstock 313 is combined with a recycle stream 320 comprising the hydrocarbon to form combined monomer-containing feedstock 304. Combined monomer-containing feedstock 304, hydrogen feedstock 306 and catalyst feed 305 are directed to reaction vessel 301. The combined monomer-containing feedstock 304 comprises an α-olefin (e.g., a $C_8$-$C_{12}$ α-olefin such as 1-decene), a hydrocarbon (e.g., a $C_8$-$C_{12}$ saturated hydrocarbon such as one or more decanes or a hydrocarbon having a 50° C. vapor pressure within 20%, e.g., within 10% or within 5%, of the α-olefin) derived from the crude PAO product, optionally one or more minor monomers and optionally a solvent. As indicated above, the hydrocarbon preferably has the same number of carbon atoms as the α-olefin. The catalyst feed 305 comprises a catalyst system, which preferably comprises a polymerization catalyst (preferably a metallocene procatalyst), a suitable co-catalyst (preferably an aluminoxane such as MAO), and optionally an anionic metalloid-containing component (e.g., a borane or a borate), as described above. The catalyst feed 305 may also include a catalyst solvent, such as toluene. Hydrogen feedstock 306 comprises hydrogen gas. In another embodiment, not shown, the hydrogen may be added to the monomer-containing feedstock 304, which is then directed to reaction vessel 301. Reaction vessel 301 also preferably includes a vent line, not shown, for venting gaseous components therefrom.

In reaction vessel 301 shown in FIG. 3, the monomers contact the polymerization catalyst, the hydrocarbon, and hydrogen under conditions effective to form the PAO, preferably a highly saturated PAO. Crude PAO product is yielded from the reaction vessel 301 via crude PAO stream 307 and directed to a catalyst separation unit 302. As shown, the catalyst separation unit comprises a catalyst removal column, which preferably is packed with one or more materials capable of deactivating the catalyst and preferably separating the catalyst from the crude PAO product to form a reduced catalyst PAO stream 308, which is directed to separation zone 303.

In FIG. 3, separation zone 303 comprises first flash vessel 321, second flash vessel 311 and one or more separation units 312 (one is shown) and preferably is capable of efficiently separating the PAO product from the other components contained in reduced catalyst PAO stream 308. Separation zone 303 also preferably is capable of efficiently separating a weight majority of the following components from reduced catalyst PAO stream 308 in separate streams: (1) the hydrocarbon, e.g., a decane; and (2) lighter components (for example, catalyst solvent such as toluene). As used herein, the term "lighter components" means components having a vapor pressure less than the vapor pressure of the major hydrocarbon contained in crude PAO stream 307.

As shown, separation zone 303 separates the reduced catalyst PAO stream 308 into first stage overhead stream 322, second stage overhead stream 314, third overhead stream 316, and purified PAO product stream 310.

In the embodiment shown, reduced catalyst PAO stream 308 is directed to first flash vessel 321, where a rough separation is made between the lighter components contained in reduced catalyst PAO stream 308 and components having a vapor pressure greater than the lighter components, e.g., PAO product, unreacted monomer and the hydrocarbon. Specifically, flash vessel 321 forms first overhead stream 322 and first bottoms stream 323. First overhead stream 322 preferably comprises a weight majority, e.g., at least 80 weight percent, at least 95 weight percent, at least 98 weight percent or at least 99 weight percent of the lighter components, e.g., catalyst solvent such as toluene, contained in the reduced catalyst PAO stream 308. First overhead stream 322 preferably comprises less than 20 weight percent, e.g., less than 10 weight percent or less than 5 weight percent, of the hydrocarbon (e.g., the $C_8$-$C_{12}$ saturated hydrocarbon such as one or more decanes or the hydrocarbon having a 50° C. vapor pressure within 20%, e.g., within 10% or within 5%, of the α-olefin) contained in reduced catalyst PAO stream 308. First bottoms stream 323 preferably comprises a weight majority, e.g., at least 80 weight percent, at least 95 weight percent, at least 98 weight percent or at least 99 weight percent of the PAO contained in the reduced catalyst PAO stream 308. First bottoms stream 323 also preferably comprises a weight majority, e.g., at least 80 weight percent, at least 95 weight percent, at least 98 weight percent or at least 99 weight percent of the hydrocarbon contained in the reduced catalyst PAO stream 308. First bottoms stream 323 also preferably comprises a weight majority, e.g., at least 80 weight percent, at least 95 weight percent, at least 98 weight percent or at least 99 weight percent of the unreacted monomer contained in the reduced catalyst PAO stream 308.

A rough separation of first bottoms stream 323 is then performed to separate the PAO product contained therein from the bulk of the unreacted monomer and $C_8$-$C_{12}$ saturated hydrocarbons contained therein. Specifically, second flash vessel 311 separates first bottoms stream 323 into second overhead stream 314 and second bottoms stream 315. Second overhead stream 314 preferably comprises a weight majority, e.g., at least 80 weight percent, at least 95 weight percent, at least 98 weight percent or at least 99 weight percent of the hydrocarbon contained in first bottoms stream 323. Second overhead stream 314 also preferably comprises a weight majority, e.g., at least 80 weight percent, at least 95 weight percent, at least 98 weight percent or at least 99 weight percent of the unreacted monomer contained in first bottoms stream 323. Second bottoms stream 315 preferably comprises a weight majority, e.g., at least 80 weight percent, at least 95 weight percent, at least 98 weight percent or at least 99 weight percent of the PAO contained in first bottoms stream 323. Optionally, second overhead stream 314 is separated into a first aliquot portion 317 and a second aliquot portion 318. Second aliquot portion 318 is removed from the reaction system 300 as a purge stream in order to avoid the undesirable build up of light contaminants in the reaction system.

Second bottoms stream 315 is then directed to separation unit 312, where a third separation is made between the PAO product and any light components (e.g., unreacted monomer, $C_8$-$C_{12}$ saturated hydrocarbon) contained in second bottoms stream 315. Specifically, separation unit 312 forms third overhead stream 316 and purified PAO product stream 310. Third overhead stream 316 preferably comprises a weight majority, e.g., at least 80 weight percent, at least 95 weight percent or at least 98 weight percent or at least 99 weight percent of the hydrocarbon (e.g., the $C_8$-$C_{12}$ saturated hydrocarbon such as one or more decanes or the hydrocarbon having a 50° C. vapor pressure within 20%, e.g., within 10% or within 5%, of the α-olefin) contained in the second bottoms stream 315. As described above with reference to second overhead stream 314, an aliquot portion, not shown, of third overhead stream 316 may be removed from the reaction system 300 as a purge stream. Purified PAO product stream 310 preferably comprises a weight majority, e.g., at least 80 weight percent, at least 95 weight percent, at least 98 weight percent or at least 99 weight percent of the PAO contained in the second bottoms stream 315. Ideally, purified PAO product stream 310 comprises substantially pure PAO product.

In the embodiment of FIG. 3, as in FIG. 2, the first aliquot portion 317 of first second overhead stream 314 is combined with third overhead stream 316 to form recycle stream 320, which is added to initial monomer-containing stream 313 to form combined monomer-containing feedstock 304. In this manner, the hydrocarbons and unreacted monomer from second overhead stream 314 and third overhead stream 316 are recycled to reaction vessel 301, surprisingly and unexpectedly resulting in improved overall selectivity and yield. In addition, first flash vessel 321 advantageously removes lighter components (e.g., catalyst solvent) from the reaction system, thereby preventing their recycle back to reaction vessel 306 and effectively maximizing selectivity for the overall process.

Various features and aspects of the present invention are illustrated further in the examples that follow. While these examples are presented to show one skilled in the art how to operate within the scope of the invention, they are not intended in any way to serve as a limitation upon the scope of the invention.

EXAMPLES

Decane Used in Polymerization

Examples 1-3 demonstrate the unexpected increase for selectivity and yields when polymerizing 1-decene in the presence of n-decane. The selectivity %, yield %, conversion % and Kv, cSt at 100° C. are as shown below in TABLE 1.

Example 1

Comparative

A two liter stainless-steel oil-heated autoclave reactor was equipped with an agitator, 1-decene delivery system (pressurized flow and mass flow control), catalyst and hydrogen delivery system (pressurized flow and mass flow control with sub-surface hydrogen sparge) capable of achieving 300 psig (2068 kPa) pressure and 150° C. and overflowing at 1 liter liquid volume. The system was equipped with a closed loop temperature, pressure and flow control (on hydrogen, decene, and catalyst). Product was collected in a product tank for subsequent catalyst deactivation and analysis.

The catalyst solution was pre-made as follows. In a glove box free of oxygen, 136.16 g dry toluene and 29.08 g of 10% methylamuminoxane (MAO) in toluene was added to a clean 1 liter bottle equipped with dip-tube cap. The MAO was mixed for 30 minutes. 0.080 g diphenylmethylene (cyclopentadienyl-9-fluorenyl)zirconium dichloride (CpFlu) catalyst was added to the 1 liter bottle and the resulting mixture was mixed an additional 15 minutes. The bottle was sealed with the dip tube cap.

A reactor containing 1 liter residual crude polydecene was heated to 115° C. and pressurized with hydrogen to 240 psig (1655 kPag). The catalyst solution bottle was connected to a high pressure liquid chromatography (HPLC) piston pump which was used to feed the catalyst to the reactor. A 10 liter decene feed tank was filled with dry 1-decene, treated by pumping through a packed column containing 3 Å molecular sieves and alumina. The reaction began (time=0) by simultaneously starting the catalyst feed pump feeding at 1 ml/min catalyst solution, the 1-decene flow controller at 2 L/hr and the hydrogen flow controller at 500 standard cubic centimeters/minute (sccm). After 2.5 hours, the reactor reached steady state and a sample was taken. Unreacted decene and decane in the sample was removed by vacuum evaporation (240° C., 5 mm Hg absolute pressure) and purged. The viscosity of the sample was determined by ASTM D445. Conversion, selectivity, and yield were also determined and are shown in TABLE 1, below.

Example 2

Example 2 simulates a recycle operation of unreacted 1-decene and 1-decane. A 2 liter stainless-steel oil-heated autoclave reactor was equipped with an agitator, 1-decene delivery system (pressurized flow and mass flow control), catalyst and 1-decane delivery system (HPLC pumps) and hydrogen delivery system (pressurized flow and mass flow control with sub-surface hydrogen sparge) capable of achieving 300 psig (2068 kPag) pressure and 150° C. and overflowing at 1 liter liquid volume. The monomer used contained about 95 wt. % 1-decene, about 3 wt. % other decene, and about 2 wt. % other hydrocarbons. The decane used contained about 98 wt. % 1-decane, about 1.5 wt. % other decane and about 0.5 wt. % unknown hydrocarbons. The system was equipped with closed loop temperature, pressure and flow control (on hydrogen, decene/decane, and catalyst). Product was collected in a product tank for subsequent catalyst deactivation and analysis.

The catalyst solution was pre-made according to the procedure of Example 1.

Two clean 1 liter bottles equipped with a dip-tube were separately filled with 1 liter each of substantially pure decane. Decene has a higher vapor pressure than decane by about 20% at 50° C. and 10% at 150° C.

A reactor containing residual polydecene was heated to 115° C. and pressurized with hydrogen to 240 psig (1655 kPag). The catalyst solution bottle and decane solution bottles were connected to separate high pressure liquid chromatography (HPLC) piston pumps which were used to feed catalyst and decane to the reactor. A 10 liter decene feed tank was filled with dry 1-decene, treated by pumping through a packed column containing 3 Å molecular sieves and alumina. The reaction began (time=0) by simultaneously starting the catalyst feed pump feeding at 1 ml/min of catalyst solution, the decane feed pump at 0.5 L/hr decane, the decene flow controller at 1.5 L/hr thus achieving 25% decane in the reactor and the hydrogen flow controller at 500 standard cubic centimeters/minute (sccm).

Average residence time was calculated by dividing the liquid volume in the reactor by the liquid flow rates. In this example, 1 liter liquid volume divided by (1.5+0.5) or 2 liters/hr=30 minutes residence time. After feeding decane/decene/hydrogen and the catalyst solution for approximately 4 reactor turnovers (residence times) which was 2 hours total, the reactor reached $1-e^{-4}$ or 98.2% of its steady-state composition. The reaction was then shut down and the product sampled for analysis.

TABLE 1, below, compares viscosity, conversion, selectivity and yield data from Examples 1 and 2.

TABLE 1

| Example | Kv, cSt at 100° C. | Conversion % | Selectivity % | Yield % |
|---|---|---|---|---|
| 1 | 110 | 89.1% | 85.2% | 75.9% |
| 2 | 105 | 87.2% | 91.3% | 79.6% |

As shown, the overall yield was much lower in Example 1 owing to the lower selectivity (due to not adding decane) and the fact that unreacted decene was purged. The addition of decane in Example 2 improved single pass and overall selectivity (simulating decane recycle). Adding decene in Example 2 (simulated decene recycle) also improved overall conversion since the unreacted decene was not purged. Note that selectivity may be increased by also increasing the Kv. However, as shown in Example 2, the selectivity surprisingly and unexpectedly increased even though the Kv increased only slightly relative to comparative Example 1.

Example 3

A material balance analysis, based on conversion, selectivity and yield data from Example 2, was performed for the reaction system described above with reference to FIG. 2, in which the monomer comprised 1-decene, with decane/decene recycle and CpFlu catalyst. The conditions for the material balance are provided below in TABLE 2. FIG. 4 provides the relative amounts of components contained in the various streams shown in FIG. 2. TABLE 3 provides the Conversion, selectivity and yield for the material balance analysis were derived from Example 2 and are provided below in TABLE 3.

TABLE 2

CONDITIONS FOR MATERIALS BALANCE ANALYSIS OF EXAMPLE 1

| Basis: 1.05 MM lbs/yr (0.48 MM kg/yr) | | Laboratory Conditions | |
|---|---|---|---|
| Production: | 7,446 hrs/yr | Cat Conc. | 0.00075 moles/L |
| Residence Time | 30.00 min | Cat. Flow | 1.00 Ml/min |
| Reactor Vol. | 25 gallons (95 L) | MAO Ratio | 750 mol/mol Zr |
| Purge Fraction | 0.177 | MAO Frac. | 0.1 |
| Flash Overhead (w/w) | 0.980 | Decene + Decane | 2.00 L/hr |
| Evaporator Overhead (w/w) | 0.999 | Decane fraction | 0.25 |

TABLE 3

CONVERSION, SELECTIVITY & YIELD

| | One Pass[1] | Overall[2] |
|---|---|---|
| Conversion | 0.872 | 1.000 |
| Selectivity | 0.913 | 0.891 |
| Yield | 0.796 | 0.891 |

[1]From combined monomer-containing stream 204 to crude PAO product stream 207.
[2]From decene feed stream 213 to purified PAO product stream 210.

Residence Time

Example 4

Using a similar system and catalyst as in Example 1, 1-decene was polymerized without the presence of decane. At time (O), the reaction was begun by simultaneously starting the catalyst feed pump at 2 ml/min of catalyst solution, the decene flow controller at 4.0 L/hr and the hydrogen flow controller at 1000 sccm. Average residence time was calculated by dividing the liquid volume in the reactor by the liquid flow rates. In this example, 1 liter liquid volume divided by 4 liters/hr=15 minutes residence time. After feeding decene/hydrogen and catalyst solution for approximately 4 reactor turnovers (residence times) which was 1 hour total, the reactor reached $1-e^{-4}$ or 98.2% of its steady-state composition. The Kv at 100° C. was measured at 147 cSt. Catalyst flow was kept proportional to decene flow in order to keep catalyst concentration constant.

Example 5

The residence time was increased to 30 minutes by feeding 1.0 ml/min of catalyst solution, 2.0 l/hr of decene and 1000 sccm of hydrogen using a similar process as in Example 4. The Kv at 100° C. was measured at 113 cSt.

Example 6

The residence time was increased to 45 minutes by feeding 0.67 ml/min of a catalyst solution, 1.3 l/hr of decene and 1000 sccm of hydrogen using a similar process as in Example 4. The Kv at 100° C. was measured at 81 cSt.

Figure 8:
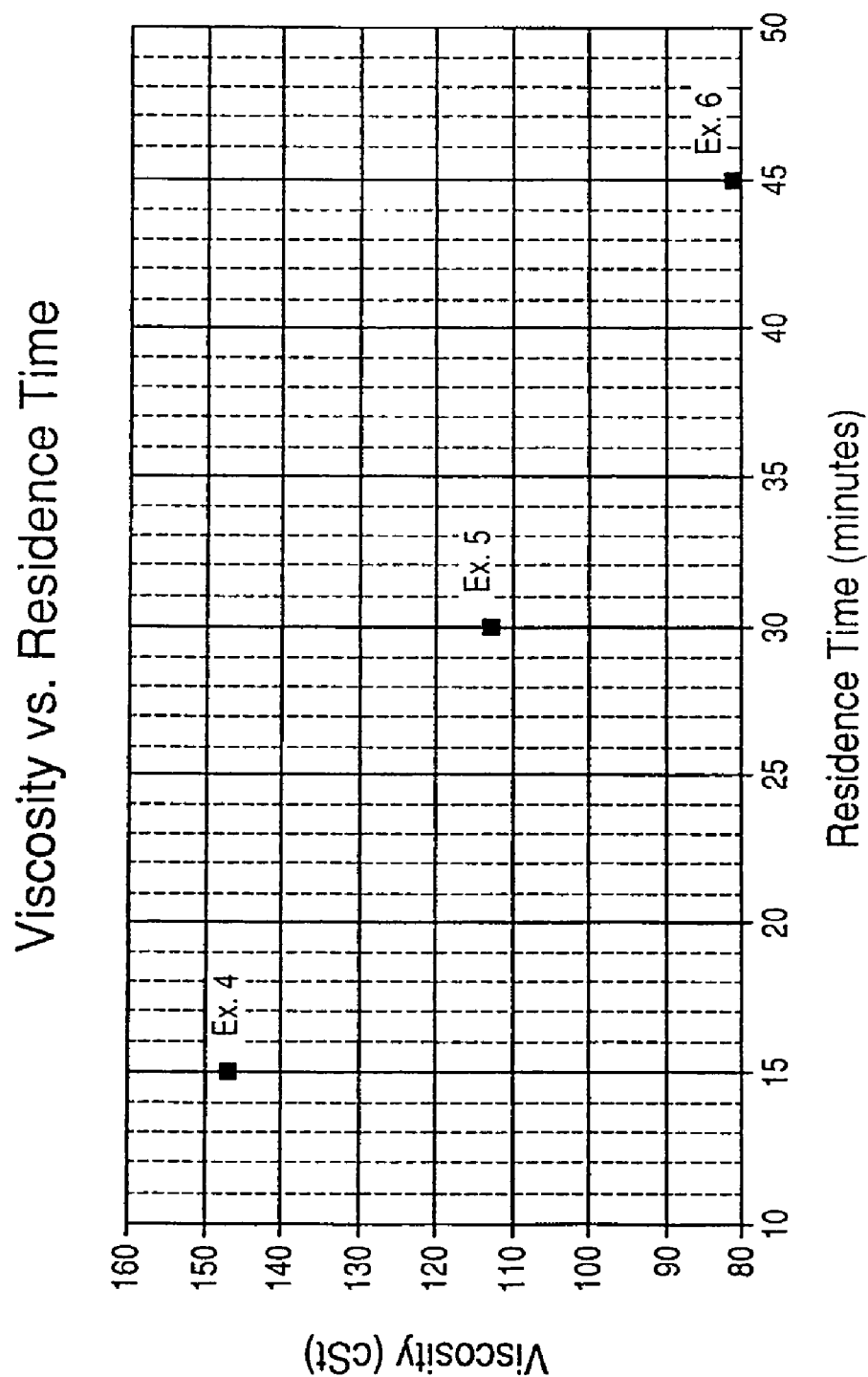
FIG. 8 is a chart plotting viscosity as a function of residence time according to Examples 4-6.

The conditions employed in Examples 4-6 and the resulting viscosities of the product PAOs are provided below in TABLE 4. FIG. 8 provides a chart plotting PAO viscosity as a function of residence time based on the data from Examples 4-6. As shown, Examples 4-6 surprisingly and unexpectedly demonstrate that as residence time increased, the viscosity decreased. The viscosity was generally proportional to molecular weight. Thus, as shown in Example 5, a residence time of 30 minutes produced a PAO with a highly desirable viscosity of about 100 cSt.

TABLE 4

| | Example 4 | Example 5 | Example 6 |
|---|---|---|---|
| Reactor Liq. Vol. (L) | 1.0 | 1.0 | 1.0 |
| T (° C.) | 115 | 115 | 115 |
| Pressure (psig; kPag) | 140; 1655 | 140; 1655 | 140; 1655 |
| H$_2$ flow (sccm) | 1000 | 1000 | 1000 |
| Decene Flow Rate (ml/min) | 4.0 | 2.0 | 1.33 |

TABLE 4-continued

|  | Example 4 | Example 5 | Example 6 |
|---|---|---|---|
| Catalyst Flow Rate (ml/min) | 2.0 | 1.0 | 0.67 |
| Residence Time (min) | 15 | 30 | 45 |
| Viscosity (cSt) | 147 | 113 | 81 |

Example 7

Structural Analysis of PAO

Figures 5A, 5B:
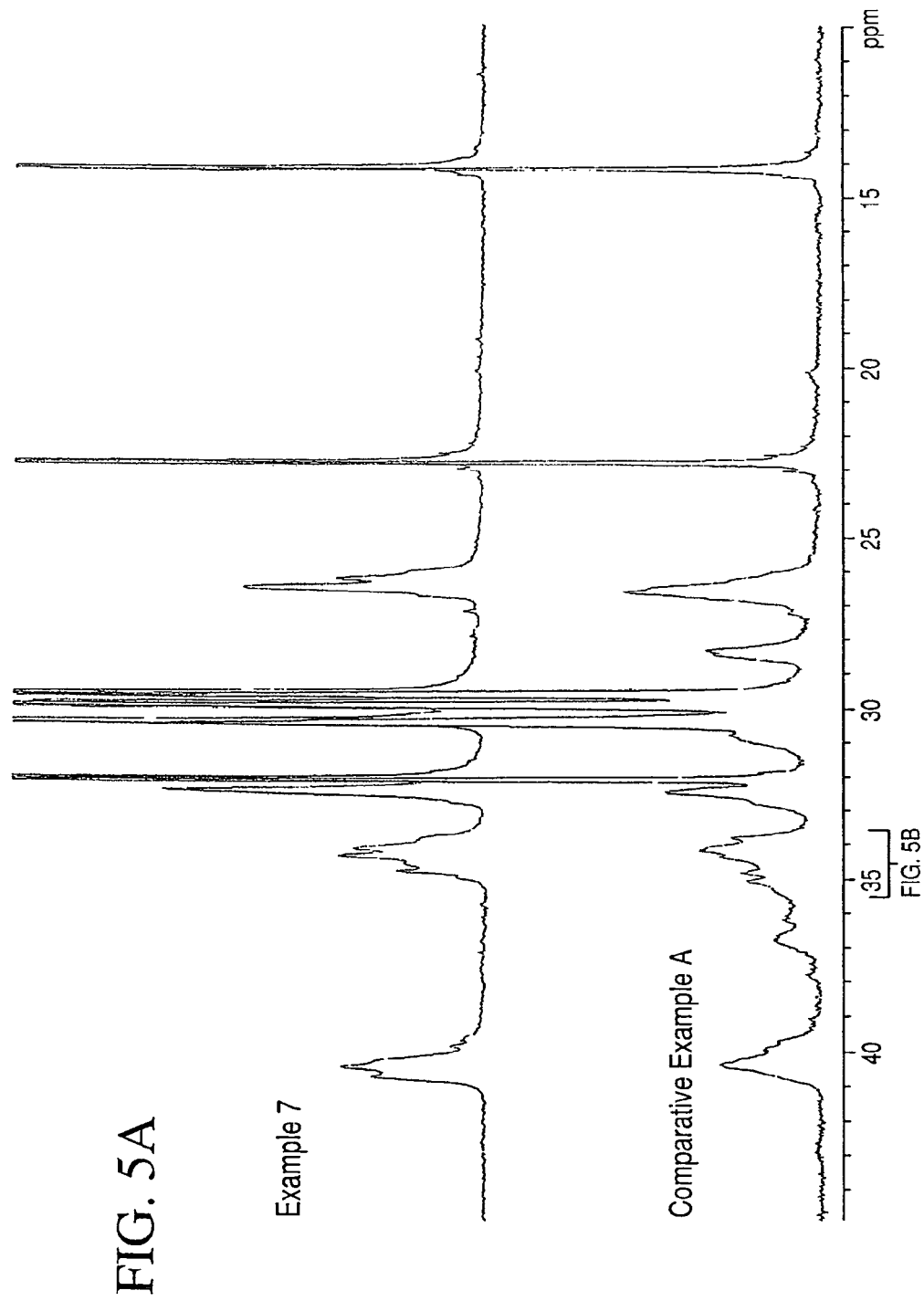
FIG. 5A is a $^{13}C$ NMR spectra in accordance to one embodiment of the present invention compared with a first comparative example.
FIG. 5B is a detail portion of the $^{13}C$ NMR spectrum of FIG. 5A.

Polydecene was prepared in a similar fashion to Example 2, but the 1-decene and decane were premixed to make a 30/70 wt % decane/1-decene mixture that was fed through the decene delivery system. The process was run at 130° C. and at 90 psig (621 kPag) and a catalyst mixture of 51.0 grams dry toluene, 19.14 grams 10 wt. % MAO and 0.068 grams CpFlu was added at a rate of 0.5 ml/minute. The resulting product was analyzed in $^{13}$C NMR. The upper portion of FIG. 5A provides a $^{13}$C NMR spectrum for Example 7 and the upper portion of FIG. 5B provides a more detailed $^{13}$C NMR spectrum in the region from 35.5 to 33.6 ppm. No discernible peaks are shown for FIG. 5A for Example 7 in the regions of 21 to 20 ppm or 42.5 ppm, indicating a low degree of misinsertion or rearrangement.

Example 8

Property Analysis

Figure 6:
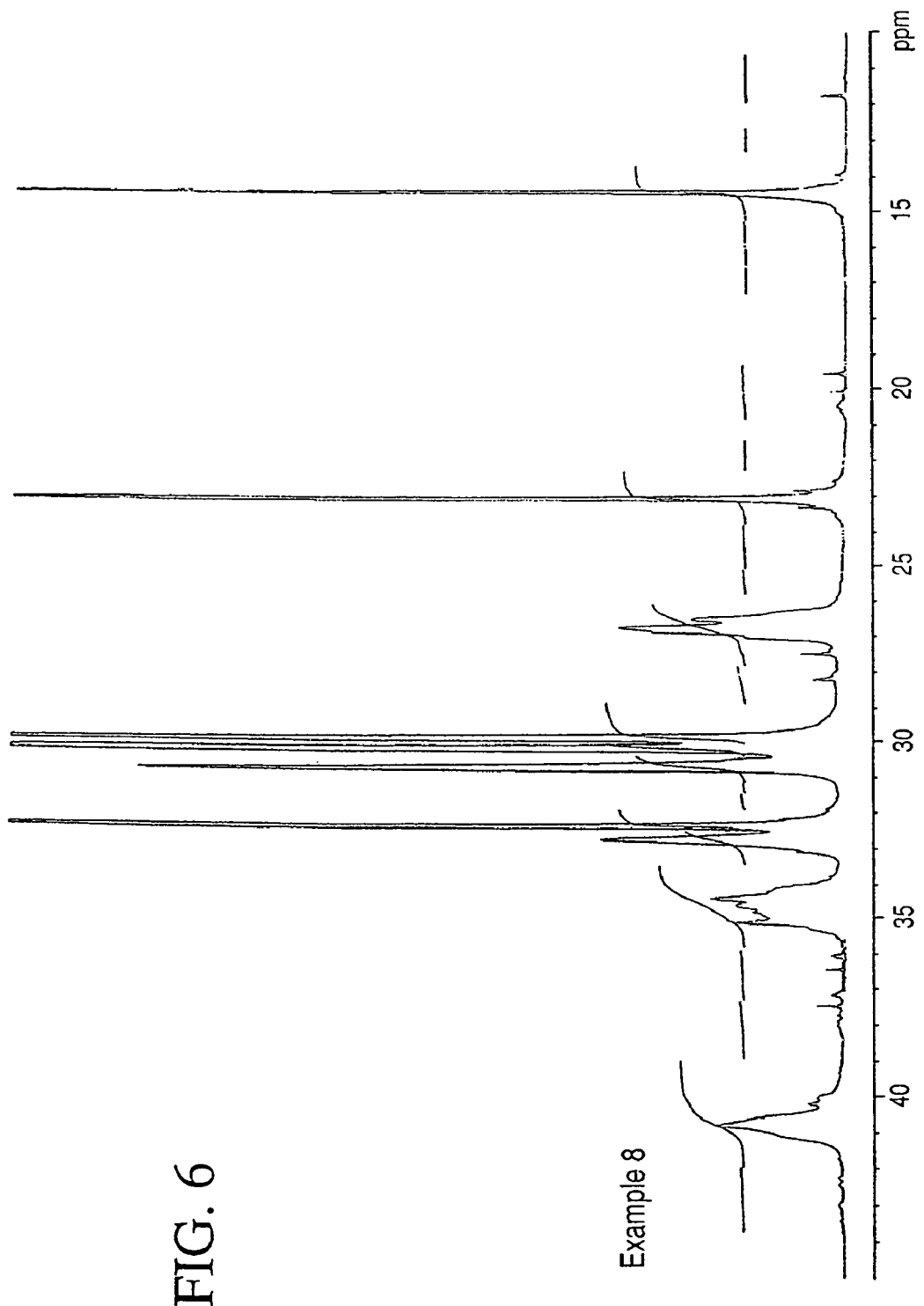
FIG. 6 is a $^{13}C$ NMR spectrum of the PAO formed in Example 8.

Polydecene was prepared in a similar fashion to Example 2, but using 140° C., 40 psig (276 kPag) and catalyst feed pump feeding at 1.5 ml/min of catalyst solution. Decane was fed at 1.0 L/hr decane, and the decene flow controller was set at 2.0 L/hr. FIG. 6 provides a $^{13}$C NMR spectrum for Example 8 and, when compared with FIG. 5, demonstrates the structural similarity of Examples 7 and 8. A property analysis is provided in TABLE 6, below.

Comparative Example A

Polydecene was prepared using a chromium catalyst through the polymerization process described in U.S. Pat. No. 4,921,272, the entirety of which is incorporated herein by reference. A $^{13}$C NMR spectrum for the polydecene is provided in the lower portion of FIG. 5A. The lower portion of FIG. 5B provides a detailed $^{13}$C NMR spectrum in the region from 35.5 to 33.6 ppm for Comparative Example A. The properties of the PAO formed in comparative Example A are shown below in TABLE 6.

FIG. 5A shows that the PAO sample from Example 7 has a much cleaner spectrum having fewer peaks than the PAO of comparative Example A, reflecting a less diverse structure than the polydecene from comparative Example A.

The polydecene from comparative Example A has additional peaks in the region of 28.0 and 36-37 ppm while there are no similar peaks in the PAO analyzed in Example 7 (see FIG. 5A). As shown, when comparing the $^{13}$C NMR spectra of FIG. 5, the relative content (area) of comparative Example A is greater than the PAO analyzed in Example 7 in the region of 35.50 to 34.96 ppm, indicating the presence of greater isotacticity in the PAO of comparative Example A. TABLE 5 compares the relative content (area) in the region of from 35.40 to 33.71 ppm from the spectra of FIG. 5B.

TABLE 5

|  |  |  | Integral | Relative Content (%) | |
|---|---|---|---|---|---|
| Triad | Pentad | Shift (PPM) | Range (PPM) | Example 7 | Comparative Example A |
| mm | mmmm | 35.40 | 35.50-35.35 | 0 | 4.5 |
|  | mmmr | 35.24 | 35.35-35.09 | 0.9 | 10.5 |
|  | rmmr | 35.04 | 35.09-34.96 | 2.9 | 6.4 |
| mr | mmrr | 34.86 | 34.96-34.75 | 12.2 | 10.7 |
|  | mmrm/rmrr | 34.68 | 34.75-34.56 | 13.8 | 9.6 |
|  | rmrm | 34.52 | 34.56-34.40 | 14.4 | 9.3 |
| rr | rrrr | 34.30 | 34.40-34.29 | 13.8 | 8.4 |
|  | rrrm | 34.19 | 34.29-34.08 | 22.2 | 17.7 |
|  | mrrm | 34.03 | 34.08-33.71 | 19.6 | 22.9 |

Comparative Example B

Figure 7:
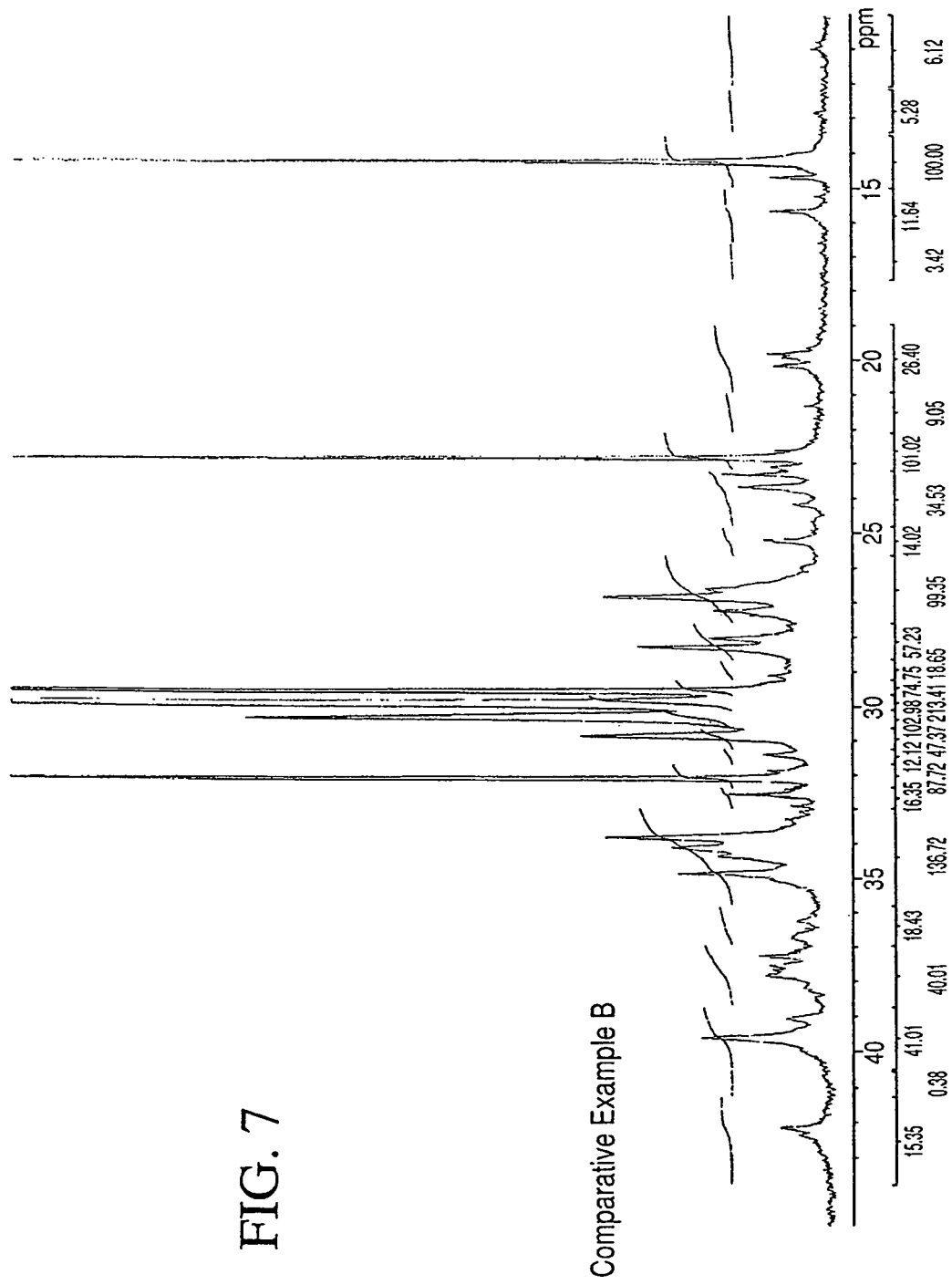
FIG. 7 is a $^{13}C$ NMR spectrum of a second comparative example.

Polydecene was prepared through the polymerization process described in U.S. Pat. No. 4,532,061, the entirety of which is incorporated herein by reference. FIG. 7 illustrates a $^{13}$C NMR spectrum for the PAO of Comparative Example B. The spectrum in FIG. 7 is not nearly as clean as the spectra shown for Example 7 in FIG. 5A, indicating a much more diverse structure than the structure formed in Example 7. FIG. 7 shows that the polydecene of Comparative Example B has a greater degree of tail-to-tail insertions than the PAOs of Example 7 or Comparative Example A based on the presence of a peak in the region of 21-20 ppm. Further, FIG. 7 shows a greater degree of head-to-head insertions by the presence of a peak in the region of 42.5 ppm. Minor head-to-tail configuration is evidenced by FIG. 7 because there is only a marginally discernible peak in the region of 41-40 ppm.

The properties of the polydecene of Examples 7 and 8 are provided below in TABLE 6 and are comparable to the polydecene of comparative Examples A and B, even though the polydecene of these examples had different structures from those of comparative Examples A and B, as shown in FIGS. 5A, 5B, 6 and 7.

TABLE 6

PROPERTY COMPARISON

|  | Example 7 | Example 8 | Comparative Example A | Comparative Example B |
|---|---|---|---|---|
| Kv, cSt at 100° C. | 280.0 | 102 | 158.4 | 99.73 |
| GPC, Mw | ** | 6,241 | 9,129 | 5,448 |
| GPC, Mn | ** | 3,192 | 3,818 | 3,372 |
| Pd | ** | 2.0 | 2.39 | 1.65 |
| % Propylene | ** | 18.6 | 18.8 | 20.7 |

Example 9

Catalyst Removal by Column Treatment

Polydecene prepared in a similar fashion to Example 7, but using 180 psig (1241 kPag) and a catalyst mixture of 106.3 grams dry toluene, 41.08 grams 10% MAO and 0.14 grams CpFlu added at a rate of 0.5 ml/minute, was deactivated using a column packed with acid clay, Filtrol F-24 manufactured by Engelhard Corporation. A metals analysis, used to determine the removal of catalyst, shown in TABLE 7, below, demonstrated the effectiveness in comparing the column deactivated polymer to the predeactivated polymer.

TABLE 7

| | Example 9 Predeactivation | Example 9 Column Deactivated |
|---|---|---|
| Metals, ppm, ASTM D-5185 | | |
| Aluminum | 195 | <1 |
| Boron | <1 | <1 |
| Calcium | <1 | <1 |
| Magnesium | <1 | <1 |
| Potassium | <1 | <1 |
| Sodium | <1 | <1 |
| Silicon | <1 | <1 |

Any feature described or claimed with respect to any disclosed implementation may be combined in any combination with any one or more other feature(s) described or claimed with respect to any other disclosed implementation or implementations, to the extent that the features are not necessarily technically incompatible, and all such combinations are within the scope of the present invention. Furthermore, the claims appended below set forth some non-limiting combinations of features within the scope of the invention, but also contemplated as being within the scope of the invention are all possible combinations of the subject matter of any two or more of the claims, in any possible combination, provided that the combination is not necessarily technically incompatible.

We claim:

1. A liquid polyalphaolefin having a kinematic viscosity at 100° C. of less than 500 cSt formed from α-olefin monomer polymerization feedstock comprising a $C_8$-$C_{12}$ α-olefin monomer in an amount greater than or equal to 50 weight percent, based on total monomer contained in the feedstock, wherein the polyalphaolefin comprises from 0.5 to 5 mole % of mm triads, from 37 to 59.5 mole % of mr triads and from 40 to 58 mole % of rr triads.

2. The polyalphaolefin of claim 1, wherein the polyalphaolefin is formed in the presence of a bridged metallocene catalyst and hydrogen.

3. The polyalphaolefin of claim 1, wherein about 75 weight percent to about 99 weight percent of the α-olefin monomer polymerization feedstock is $C_8$-$C_{12}$ α-olefin.

4. The polyalphaolefin of claim 1, wherein the $C_8$-$C_{12}$ α-olefin monomer is 1-decene.

5. The polyalphaolefin of claim 2, wherein the bridged metallocene catalyst is diphenylmethylene (cyclopentadienyl-9-fluorenyl) zirconium dichloride.

6. The polyalphaolefin of claim 2, wherein the monomer is polymerized in the presence of an alkylaluminoxane co-catalyst.

7. The polyalphaolefin of claim 1, which is a homopolymer of 1-decene.

8. The polyalphaolefin of claim 3, wherein about 1 weight percent to about 25 weight percent of the α-olefin monomer polymerization feedstock is selected from ethylene, propylene, 2-methylpropene, 1-butene, 3-methyl-1-butene, 1-pentene, 4-methyl-1-pentene, 1-hexene, 1-heptene, 1-tridecene, 1-tetradecene, 1-pentadecene, 1-hexadecene, 1-heptadecene, 1-octadecene and 1-nonadecene.

9. The polyalphaolefin of claim 8, wherein about 80 weight percent to about 90 weight percent of the α-olefin monomer polymerization feedstock is a $C_8$-$C_{12}$ α-olefin and about 10 weight percent to about 20 weight percent of the α-olefin monomer polymerization feedstock is selected from ethylene, propylene, 2-methylpropene, 1-butene, 3-methyl-1-butene, 1-pentene, 4-methyl-1-pentene, 1-hexene, 1-heptene, 1-tridecene, 1-tetradecene, 1-pentadecene, 1-hexadecene, 1-heptadecene, 1-octadecene and 1-nonadecene.

10. The polyalphaolefin of claim 3, wherein about 75 weight percent to about 99 weight percent of the α-olefin monomer polymerization feedstock is decene.

11. The polyalphaolefin of claim 10, wherein about 75 weight percent to about 99 weight percent of the α-olefin monomer polymerization feedstock is decene and about 1 weight percent to about 25 weight percent of the α-olefin monomer polymerization feedstock is selected from ethylene, propylene, 2-methylpropene, 1-butene, 3-methyl-1-butene, 1-pentene, 4-methyl-1-pentene, 1-hexene, 1-heptene, 1-heptene, 1-octene, 1-nonene, 1-undecene, 1-dodecene, 1-tridecene, 1-tetradecene, 1-pentadecene, 1-hexadecene, 1-heptadecene, 1-octadecene and 1-nonadecene.

12. The polyalphaolefin of claim 11, wherein about 75 weight percent to about 99 weight percent of the α-olefin monomer polymerization feedstock is decene and about 1 weight percent to about 25 weight percent of the α-olefin monomer polymerization feedstock is selected from 1-octene, 1-nonene, 1-undecene and 1-dodecene.

13. The polyalphaolefin of claim 11, wherein about 75 weight percent to about 99 weight percent of the α-olefin monomer polymerization feedstock is decene and about 1 weight percent to about 25 weight percent of the α-olefin monomer polymerization feedstock is selected from ethylene, propylene, 2-methylpropene, 1-butene, 3-methyl-1-butene, 1-pentene, 4-methyl-1-pentene, 1-hexene and 1-heptene.

14. The polyalphaolefin of claim 1, wherein the polyalphaolefin has a weight average molecular weight of from about 500 to about 80,000.

15. The polyalphaolefin of claim 14, wherein the polyalphaolefin has a weight average molecular weight of from 750 to about 60,000.

16. The polyalphaolefin of claim 1, wherein the polyalphaolefin has a $T_g$ of below about −20° C.

17. The polyalphaolefin of claim 1, wherein the polyalphaolefin has a kinematic viscosity at 100° C. from 50 to 500 centistokes.

18. The polyalphaolefin of claim 1, wherein the polyalphaolefin has a kinematic viscosity at 100° C. from 50 to 150 centistokes.

* * * * *